US012311663B2

(12) United States Patent
Nagahashi et al.

(10) Patent No.: US 12,311,663 B2
(45) Date of Patent: May 27, 2025

(54) LIQUID DISCHARGE HEAD, LIQUID DISCHARGE DEVICE, AND LIQUID DISCHARGE APPARATUS

(71) Applicants: Kazuto Nagahashi, Kanagawa (JP); Takuma Hirabayashi, Tokyo (JP); Keishi Miwa, Kanagawa (JP); Yukimasa Matsuda, Kanagawa (JP)

(72) Inventors: Kazuto Nagahashi, Kanagawa (JP); Takuma Hirabayashi, Tokyo (JP); Keishi Miwa, Kanagawa (JP); Yukimasa Matsuda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 166 days.

(21) Appl. No.: 18/116,323

(22) Filed: Mar. 2, 2023

(65) Prior Publication Data

US 2023/0294403 A1 Sep. 21, 2023

(30) Foreign Application Priority Data

Mar. 15, 2022 (JP) ................................ 2022-040811
Aug. 2, 2022 (JP) ................................ 2022-123296
Nov. 28, 2022 (JP) ................................ 2022-189507

(51) Int. Cl.
*B41J 2/14* (2006.01)
*B41J 2/055* (2006.01)

(52) U.S. Cl.
CPC ........... *B41J 2/14233* (2013.01); *B41J 2/055* (2013.01); *B41J 2/14201* (2013.01); *B41J 2002/14241* (2013.01); *B41J 2002/14362* (2013.01); *B41J 2202/19* (2013.01)

(58) Field of Classification Search
CPC .... B41J 2/14233; B41J 2/055; B41J 2/14201; B41J 2002/14241; B41J 2002/14362; B41J 2202/19
See application file for complete search history.

(56) References Cited

U.S. PATENT DOCUMENTS 9,505,214 B2 * 11/2016 Takahashi ................ B41J 2/055
2015/0375505 A1 12/2015 Takahashi

FOREIGN PATENT DOCUMENTS

JP 2006-224672 8/2006
JP 2015-085565 5/2015
JP 2016-026912 2/2016

* cited by examiner

*Primary Examiner* — Geoffrey S Mruk
(74) *Attorney, Agent, or Firm* — XSENSUS LLP

(57) ABSTRACT

A liquid discharge head includes a piezoelectric element configured to vibrate; a damper configured to reduce vibration energy generated by the piezoelectric element; a first substrate joined to the damper, the first substrate having a first space facing one surface of the damper vibrates; a second substrate opposite to the first substrate via the damper, the second substrate having: a recess accommodating the piezoelectric element, and a second space facing another surface of the damper, the second space disposed opposite to the first space via the damper and a leg between the damper and the second substrate the leg joined to the second substrate with an adhesive including a filler.

20 Claims, 19 Drawing Sheets

COMPARATIVE EXAMPLE 1

FIG. 13
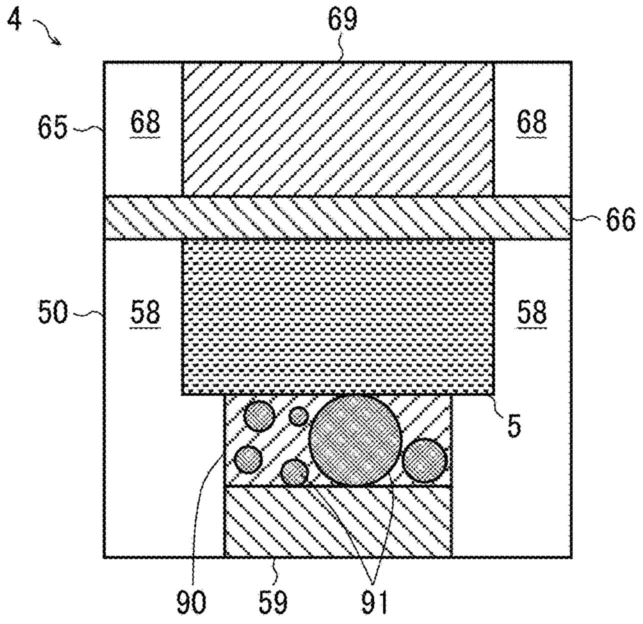
FIG. 14
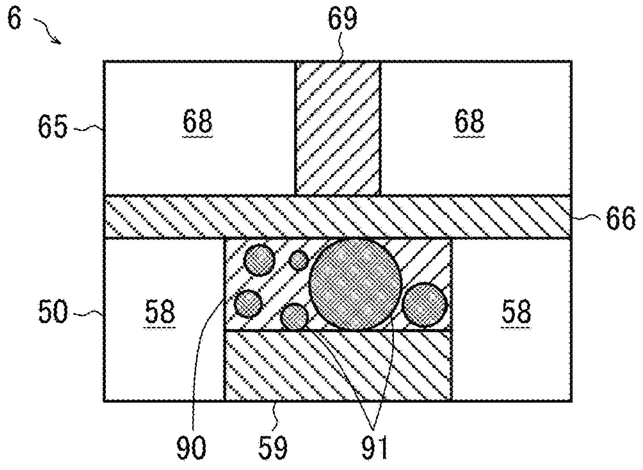
FIG. 15
| | DAMPER CRACK GENERATION RATE (%) | NUMBER |
|---|---|---|
| FIRST EMBODIMENT | 0 | 24 |
| SECOND EMBODIMENT | 0 | 24 |
| COMPARATIVE EXAMPLE 1 | 40 | 24 |

LIQUID DISCHARGE HEAD, LIQUID DISCHARGE DEVICE, AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2022-040811, filed on Mar. 15, 2022, in the Japan Patent Office, Japanese Patent Application No. 2022-123296, filed on Aug. 2, 2022, in the Japan Patent Office, Japanese Patent Application No. 2022-189507, filed on Nov. 28, 2022, in the Japan Patent Office, the entire disclosure of which are hereby incorporated by reference herein.

BACKGROUND

Technical Field

The present embodiment relates to a liquid discharge head, a liquid discharge device, and a liquid discharge apparatus.

Related Art

There is a liquid discharge head adopted in an inkjet image forming apparatus. The liquid discharge head includes a liquid chamber substrate that constitutes individual chambers that communicate with nozzles, a piezoelectric-element-holding substrate that is joined to the liquid chamber substrate on a side opposite to a nozzle plate provided with the nozzles, and has recesses that contain piezoelectric elements, dampers that dissipate vibration energy to reduce an impact or an amplitude of vibration, and a damper-holding substrate that has spaces in which the dampers can vibrate. In a case where the piezoelectric-element-holding substrate and the dampers are joined, it is preferable to perform the joining with an adhesive including fillers to improve the joining strength. As a method for joining the dampers and the damper-holding substrate, exemplified is a method in which a damper-holding substrate is joined, with an adhesive, to a surface of a substrate on which films have been formed of a damper material, and then the substrate is polished at a time of film formation.

The above-described liquid discharge head includes a plurality of nozzles, a plurality of individual chambers communicating with the respective nozzles, actuators that generate energy for raising the pressures in the respective individual chambers, and a common chamber communicating with each of the individual chambers. In the liquid discharge head, ink is supplied from the common chamber to the individual chambers communicating with the respective nozzles, and the actuators corresponding to the respective individual chambers are driven to raise the pressures in the respective individual chambers to discharge the ink from the nozzles. At this time, when mutual interference in which a pressure fluctuation generated in the individual chamber propagates to the common chamber communicating with each individual chamber, and the pressure fluctuation that has propagated affects the ink in the adjacent individual chambers occurs, a leakage or discharge of liquid droplets from an unintended nozzle, or an unstable discharge state is induced, and it becomes difficult to obtain a high-quality image.

Therefore, there is a technique for obtaining a damper effect in which a pressure fluctuation that has propagated to the common chamber and reducing vaporization of moisture from the common chamber. A liquid discharge head includes an air storage chamber arranged opposite the common chamber via a flexible member forming at least part of the common chamber, and a valve through which the air storage chamber can communicate with the outside.

SUMMARY

A liquid discharge head includes a piezoelectric element configured to vibrate; a damper configured to reduce vibration energy generated by the piezoelectric element; a first substrate joined to the damper, the first substrate having a first space facing one surface of the damper vibrates; a second substrate opposite to the first substrate via the damper, the second substrate having: a recess accommodating the piezoelectric element, and a second space facing another surface of the damper, the second space disposed opposite to the first space via the damper and a leg between the damper and the second substrate the leg joined to the second substrate with an adhesive including a filler.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 13 is an enlarged view illustrating a characteristic portion of a liquid discharge head according to a second embodiment of the present embodiment;

FIG. 14 is an enlarged view illustrating a characteristic portion of a liquid discharge head used when a comparison test for comparing crack generation rates in the liquid discharge head according to each embodiment of the present embodiment was performed;

FIG. 15 is a table illustrating a comparison test result of the crack generation rates in the liquid discharge head according to each embodiment of the present embodiment and the liquid discharge head illustrated in FIG. 14;

Figure 1:
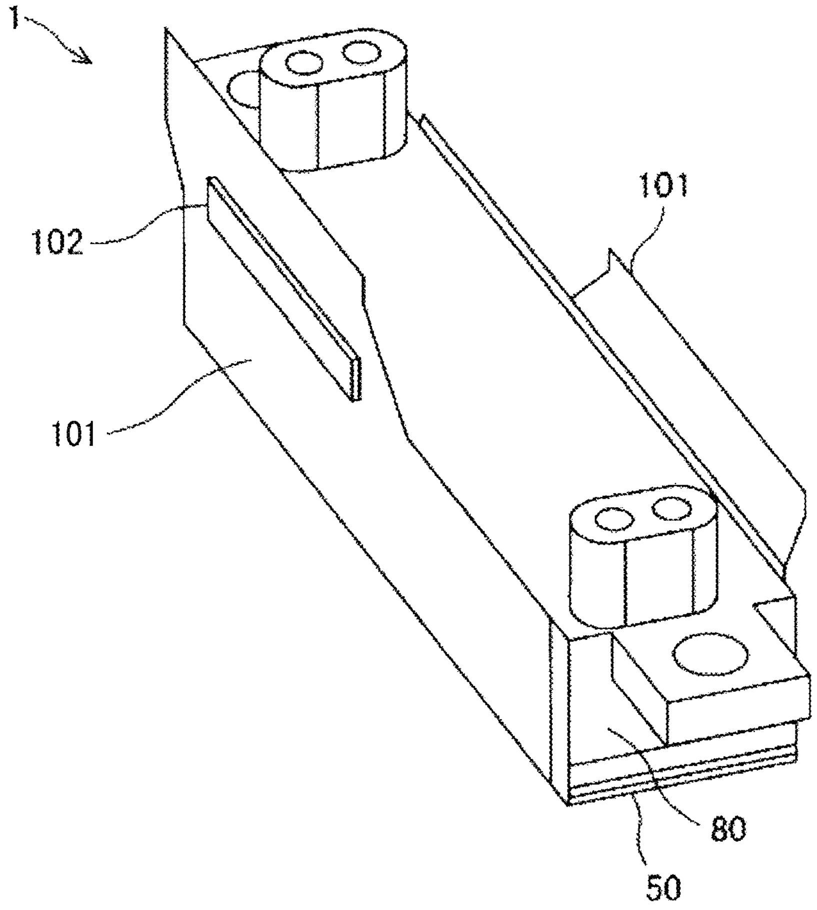
FIG. 1 is a schematic perspective view of a liquid discharge head to which an embodiment of the present embodiment can be applied.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Figure 2:
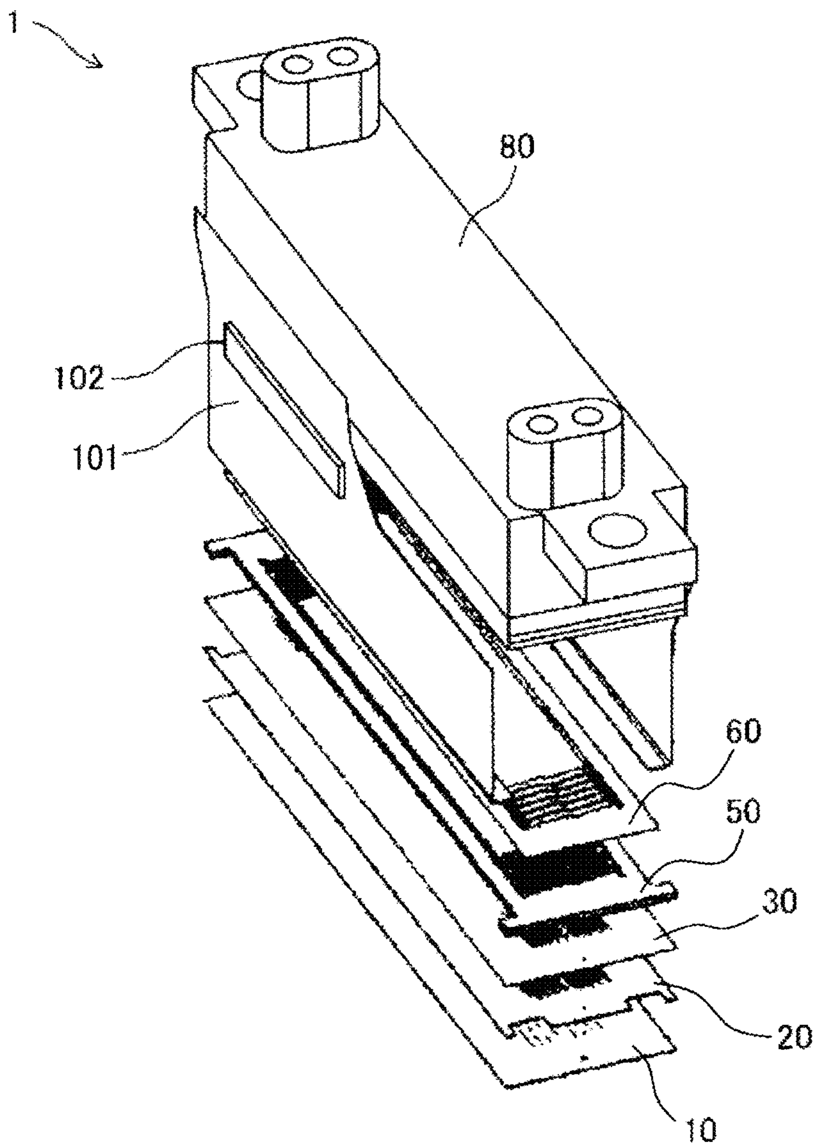
FIG. 2 is a schematic exploded perspective view of the liquid discharge head to which an embodiment of the present embodiment can be applied.

FIGS. 1 and 2 are schematic perspective views of a liquid discharge head to which an embodiment of the present embodiment can be applied. In FIGS. 1 and 2, a liquid discharge head 1 includes a nozzle plate 10, a channel plate 20, which is an individual-channel member, a diaphragm member 30, a common-channel member 50, a damper member 60, a frame member 80, and a flexible wiring board 101, on which a drive circuit 102 is mounted.

A nozzle substrate forming the nozzle plate 10, actuator substrates forming the channel plate 20 and the diaphragm member 30, a sub-frame substrate forming the common-channel member 50, and a damper substrate forming the damper member 60 each include a single-crystal-silicon (Si) wafer as a substrate material. Regarding these substrates, a plurality of chips (liquid discharge heads) is simultaneously produced on a Si wafer by microelectromechanical systems (MEMS) or a microfabrication technique of a semiconductor device, and substrates after the chip formation are joined to form the liquid discharge head 1.

Figure 3:
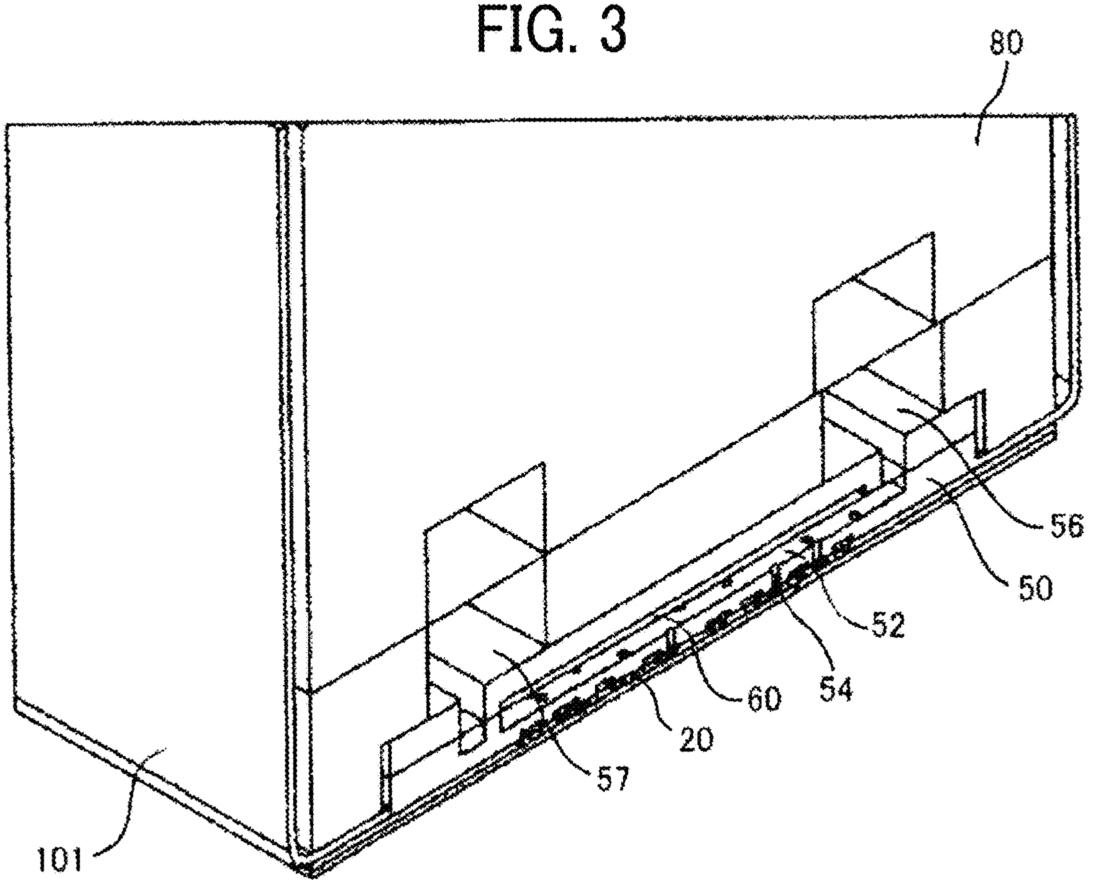
FIG. 3 is a schematic, perspective, cross-sectional view of the liquid discharge head to which an embodiment of the present embodiment can be applied.

FIG. 3 is a cross-sectional perspective view of a liquid discharge head that is applicable an embodiment of the present disclosure along a transverse direction of the liquid discharge head.

As illustrated in FIG. 3, the liquid discharge head 1 includes a nozzle plate 10, a channel plate 20 serving as an individual-channel member, a diaphragm member 30, a common-channel member 50, a damper member 60, a frame member 80, and a flexible wiring board 101 mounting a drive circuit 102.

The common-channel member 50 includes one or more common-supply main channels 56 communicating with multiple common-supply branch channels 52, and one or more common-collection main channels 57 communicating with multiple common-collection branch channels 53.

FIG. 3 is a cross-sectional view of the liquid discharge head at one position of the common-supply branch channel 52 extending in the transverse direction of the liquid discharge head.

Figure 4:
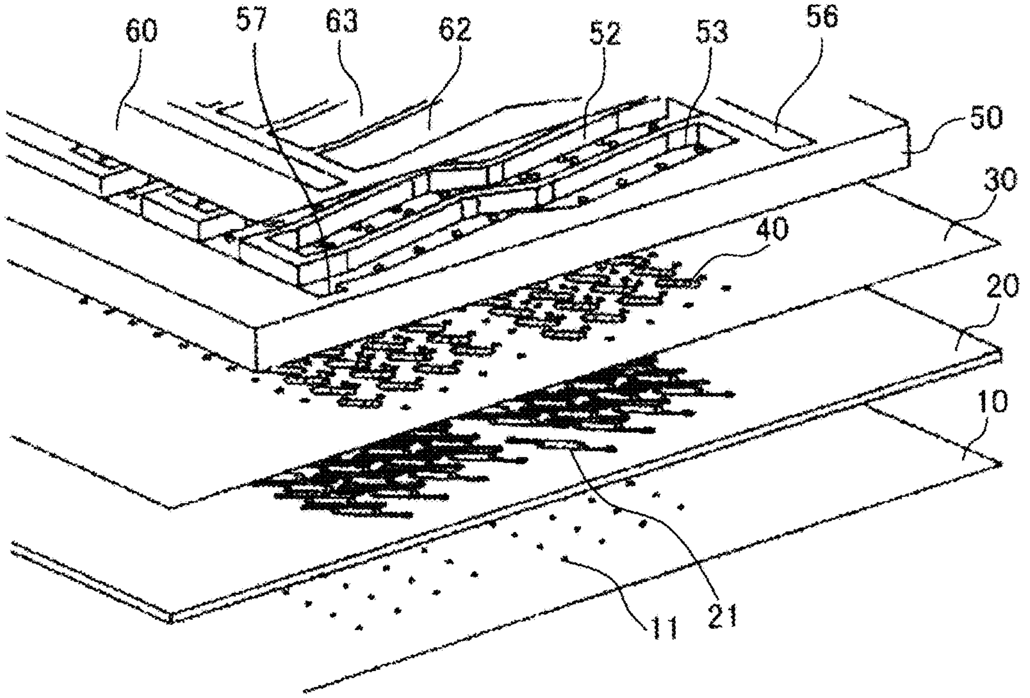
FIG. 4 is a schematic exploded perspective view of the liquid discharge head, from which a frame member is removed, to which an embodiment of the present embodiment can be applied.
Figure 5:
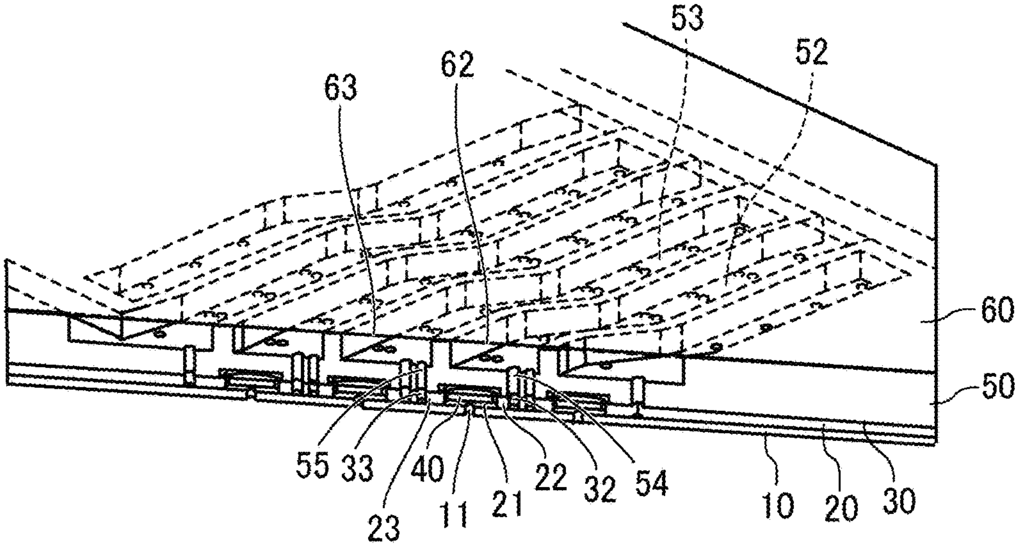
FIG. 5 is a schematic, perspective, cross-sectional view of a channel portion of the liquid discharge head to which an embodiment of the present embodiment can be applied.
Figure 7:
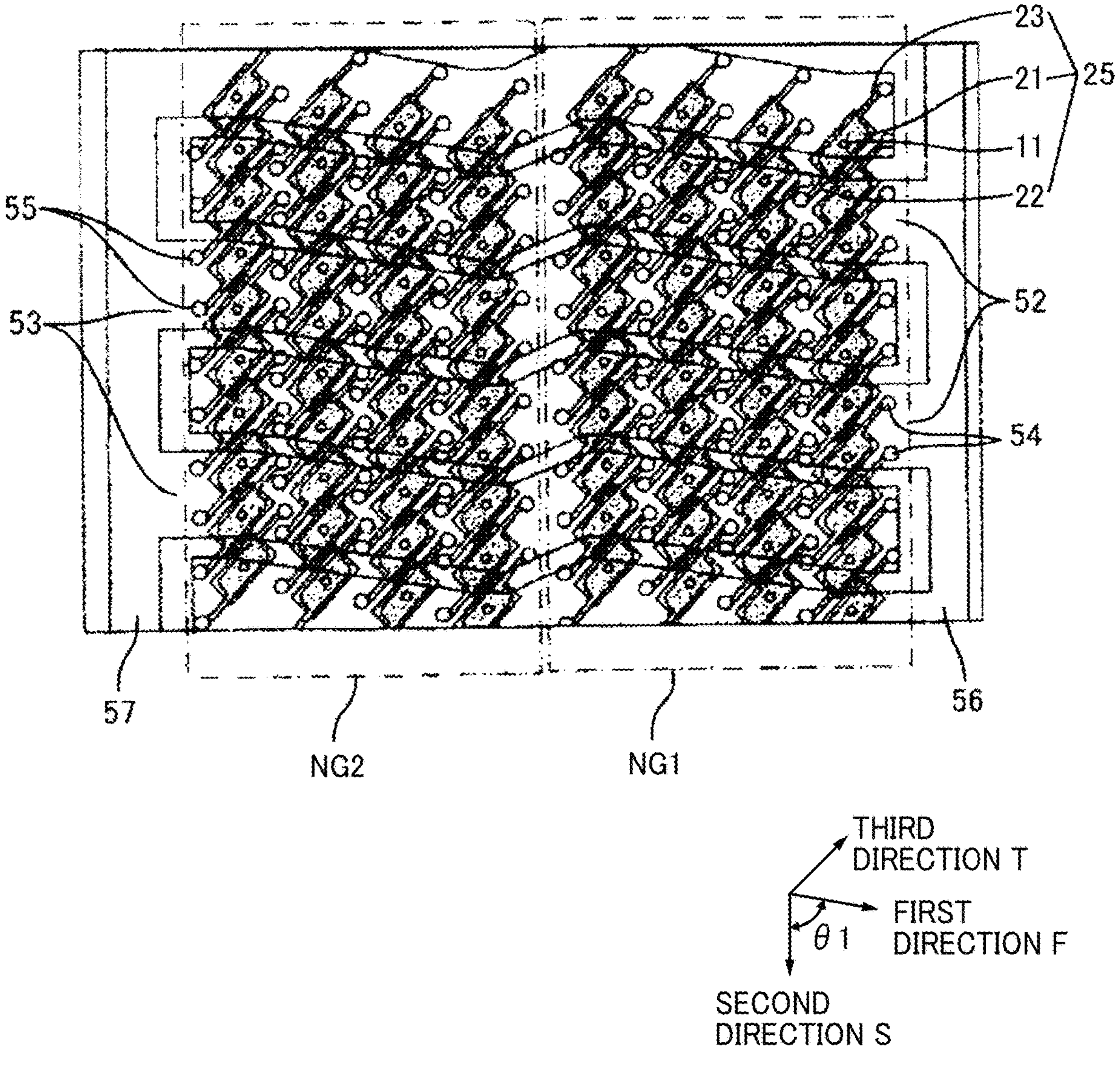
FIG. 7 is a schematic plan view of a channel portion of the liquid discharge head to which an embodiment of the present embodiment can be applied.

As illustrated in FIGS. 4 and 5, the nozzle plate 10 is provided with a plurality of nozzles 11 for discharging liquid droplets. The plurality of nozzles 11 is two-dimensionally arranged in a matrix, and is arranged in such a manner that the plurality of nozzles 11 aligns in three directions of a first direction F, a second direction S, and a third direction T, as illustrated in FIG. 7.

Figure 6:
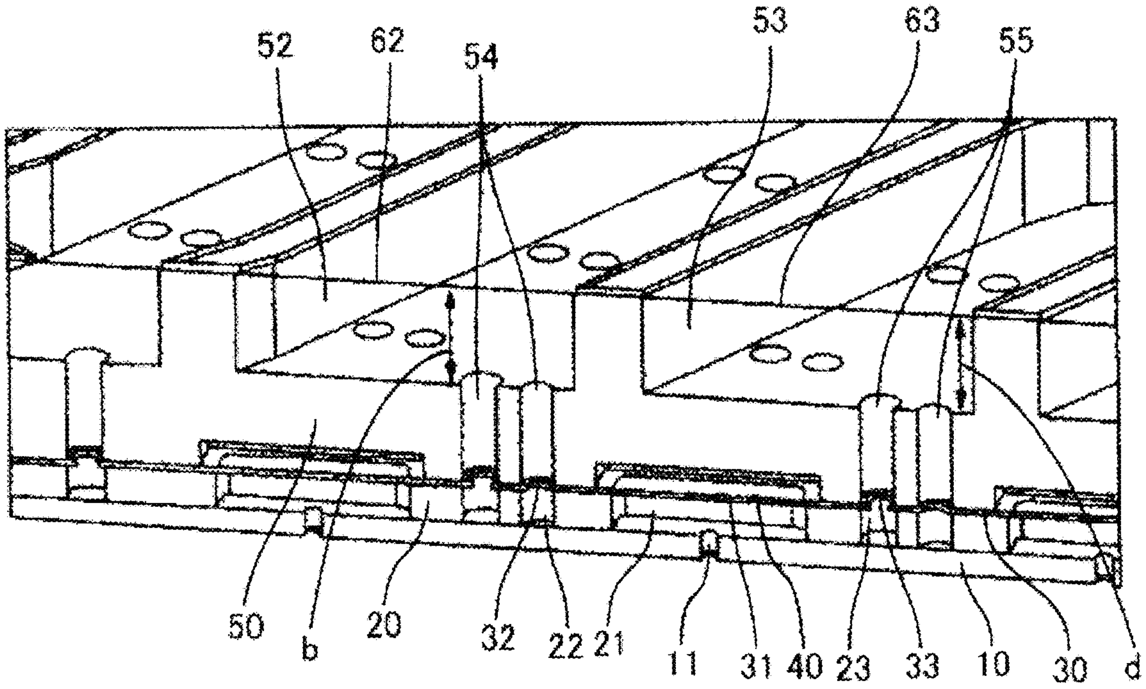
FIG. 6 is an enlarged, perspective, cross-sectional view of a channel portion of the liquid discharge head to which an embodiment of the present embodiment can be applied.

As illustrated in FIGS. 5 and 6, the channel plate 20 includes pressure chambers 21, which are a plurality of individual chambers communicating with the plurality of nozzles 11, respectively, a plurality of individual supply channels 22 communicating with the plurality of pressure chambers 21, respectively, and a plurality of individual collection channels 23 communicating with the plurality of pressure chambers 21, respectively. As illustrated in FIG. 7, each pressure chamber 21, and the individual supply channel 22 and the individual collection channel 23 communicating with the pressure chamber 21 are collectively referred to as an individual channel 25.

The diaphragm member 30 forms a diaphragm 31, which is a deformable wall surface of the pressure chambers 21. The diaphragm 31 is integrally provided with piezoelectric elements 40. The diaphragm member 30 has supply-side openings 32 communicating with the individual supply channels 22, and collection-side openings 33 communicating with the individual collection channels 23. The piezoelectric elements 40 are electromechanical transducers, and are pressure generators for deforming the diaphragm 31 to apply a pressure to the liquid in the pressure chambers 21.

The piezoelectric elements 40 is accommodated in a recess 75 formed in the common-channel member 50. The recess 75 is opposite to the space 58 via a wall 85 partitioning the space 58 and the recess 75.

The channel plate 20 and the diaphragm member 30 are not limited to being separate members. For example, the channel plate 20 and the diaphragm member 30 may be integrally formed of the same member using a silicon on insulator (SOI) substrate, That is, an SOI substrate, in which a silicon oxide film, a silicon layer, and a silicon oxide film are formed in this order on a silicon substrate, may be used, and the silicon substrate may be the channel plate 20, and the silicon oxide film, the silicon layer, and the silicon oxide film may form the diaphragm 31. In such a configuration, the layer structure of the silicon oxide film, the silicon layer, and the silicon oxide film in the SOI substrate forms the diaphragm member 30. As described above, the diaphragm member 30 may be a diaphragm member including materials formed as films on a surface of the channel plate 20.

The common-channel member 50 has a plurality of common-supply branch channel 52 communicating with two or more of the individual supply channels 22, and a plurality of common-collection branch channels 53 communicating with two or more of the individual collection channels 23. The plurality of common-supply branch channel 52 and the plurality of common-collection branch channels 53 are formed alternately in the second direction S of the nozzles 11 and are adjacent to each other. The common-channel member 50 has through holes serving as supply ports 54 through which the supply-side openings 32 of the individual supply channels 22 communicate with the common-supply branch channel52, and through holes serving as collection ports 55 through which the collection-side openings 33 of the individual collection channels 23 communicate with the common-collection branch channels 53.

The common-channel member 50 also has one or a plurality of common-supply main channels 56 communicating with the plurality of common-supply branch channel52, and one or a plurality of common-collection main channels 57 communicating with the plurality of common-collection branch channels 53.

The damper member 60 includes supply-side dampers 62 that are opposite (face) the supply ports 54 of the common-supply branch channel52, and collection-side dampers 63 that are opposite (face) the collection ports 55 of the common-collection branch channels 53.

The common-supply branch channel52 and the common-collection branch channels 53 are configured by sealing, with damper plates 66 as dampers made of thin plates, grooves arrayed in such a manner that the grooves are alternately disposed in the common-channel member 50, which is the same member. The damper plates 66 corresponding to the common-supply branch channel52 constitute the supply-side dampers 62. The damper plates 66 corresponding to the common-collection branch channels 53 constitute the collection-side dampers 63. As the damper plates 66, a metal-thin film or an inorganic thin film resistant to organic solvent is preferably used, and the thickness of the damper plates 66 is preferably 10 μm or less. The damper plates 66 have a stacked structure including a plurality of layers. The damper plate 66 may be referred simply as a “damper”.

The liquid discharge head 1 illustrated in the present embodiment is provided with the damper member 60 that suppresses an effect (for example, crosstalk) of a pressure fluctuation of the liquid channel (for example, the individual supply channel 22) generated at a time of a liquid discharge from the nozzle 11, on a liquid discharge from another nozzle 11. The damper member 60 appropriately exerts a damper function, so that the generation of crosstalk in which vibration (pressure fluctuation) at a time of a liquid discharge propagates via the liquid, and affects a liquid discharge from an adjacent nozzle is suppressed to stabilize the precision in a liquid discharge from each nozzle 11.

Figure 8:
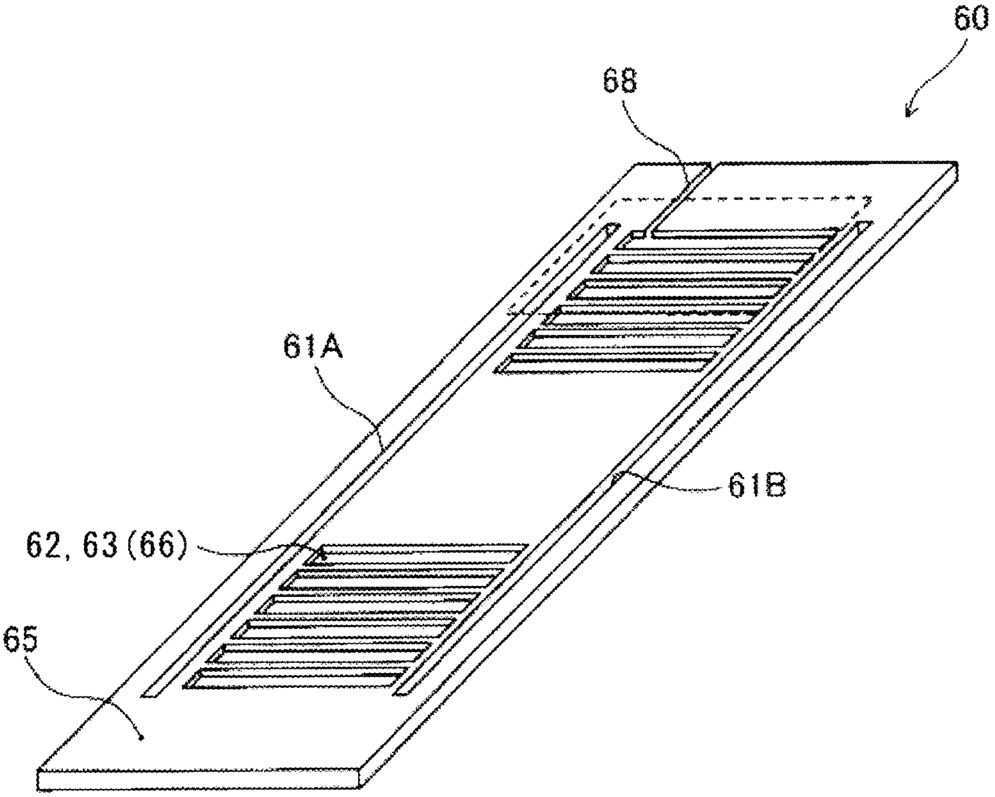
FIG. 8 is a schematic perspective view illustrating a damper member of the liquid discharge head to which an embodiment of the present embodiment can be applied.

As illustrated in FIG. 8, the damper member 60 includes a damper frame substrate 65 as a damper-holding substrate made of a rectangular plate-like member. The damper frame substrate 65 has through holes 61A and 61B along long sides of the damper frame substrate 65. The through holes 61A and 61B communicate with the common-supply main channel 56 and the common-collection main channel 57 of the common-channel member 50. In a region between the through holes 61A and 61B of the damper frame substrate 65, the supply-side dampers 62 and the collection-side dampers 63 are formed. Thus, the damper member 60 is constituted. The damper frame substrate 65 may also referred to as a “first substrate”.

The liquid discharge head 1 having the above-described configuration is described below.

Figure 9:
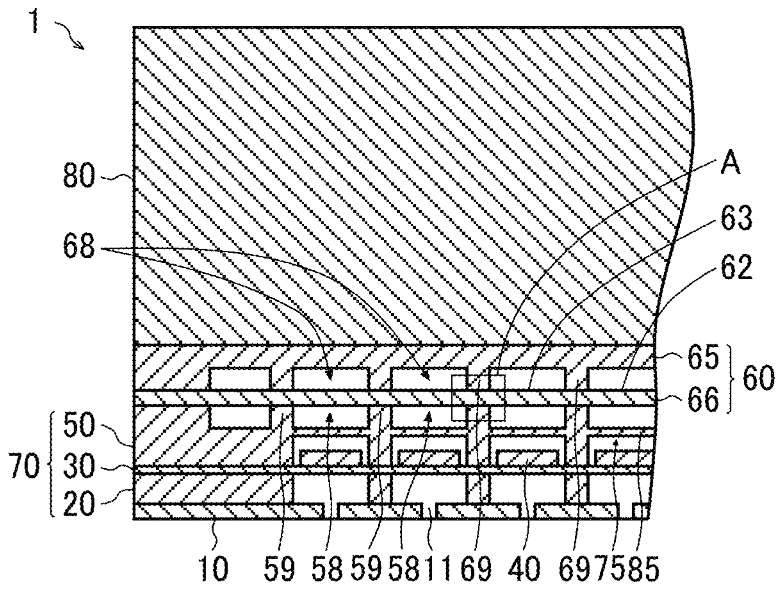
FIG. 9 is a schematic view illustrating a stacked state of a nozzle plate; a channel plate, a diaphragm member, a common-channel member, a damper member, and the frame member in the liquid discharge head to which an embodiment of the present embodiment can be applied.

FIG. 9 is a schematic view illustrating a stacked state of the nozzle plate 10, the channel plate 20, the diaphragm member 30, the common-channel member 50, the damper member 60, and the frame member 80 in the liquid discharge head 1. In FIG. 9, the channel plate 20, the diaphragm member 30, and the common-channel member 50 constitute a piezoelectric-element-holding substrate 70. The damper member 60 as illustrated in FIG. 9 is configured by putting the damper plates 66 on the damper frame substrate 65 having displacement spaces (gaps) for allowing displacement of the damper plates 66, and joining the damper plates 66 and the damper frame substrate 65 with an adhesive.

In FIG. 9, the common-channel member 50 has a plurality of spaces 58 in which the damper plates 66 can vibrate. Each space 58 is formed between second partition walls 59, which are a plurality of second partition walls 59 of the common-channel member 50. The second partition wall 59. The damper frame substrate 65 (damper-holding substrate) also has a plurality of spaces 68 in which the damper plates 66 can vibrate. Each space 68 is formed between first partition walls 69, which are a plurality of first partition walls 69 of the damper frame substrate 65 (damper-holding substrate). The space 68 is also referred to as a “first space”.

The spaces 58 and 68 are arranged at positions where the spaces 58 and 68 face each other with the damper plate 66 interposed therebetween. The space 68 is also referred to as a “first space”, and the space 58 is also referred to as a “second space”.

Figure 10:
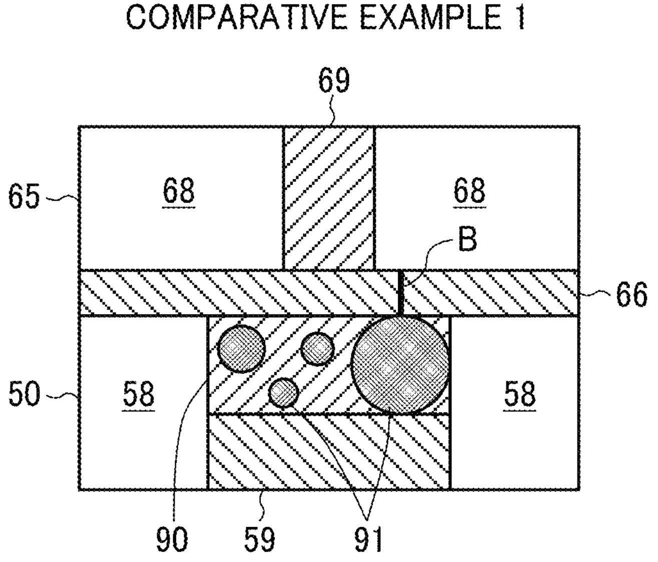
FIG. 10 is an enlarged view illustrating a joint between the common-channel member in FIG. 9 forming a piezoelectric-element-holding substrate, a damper plate, and a damper frame substrate.

FIG. 10 illustrates a portion of a liquid discharge head of a comparative example 1. FIG. 10 is an enlarged view of a portion A in FIG. 9, that is, a joint between the second partition wall 59 of the common-channel member 50 forming the piezoelectric-element-holding substrate 70, the damper plate 66, and the first partition wall 69 of the damper frame substrate 65.

As illustrated in FIG. 10, the second partition wall 59 and the damper plate 66 are adhered to each other with an adhesive 90. As the adhesive 90 used here, it is preferable to use an adhesive including fillers 91 as infill for the purpose of improving the adhesiveness, improving the adhesive strength, or the like. The adhesive 90 illustrated in the present embodiment includes the plurality of fillers 91 each having a spherical shape. The maximum particle diameter of the fillers 91 is 10 μm.

As illustrated in FIG. 10, in a case where the diameter of the filler 91 is large and the filler 91 is directly sandwiched between the second partition wall 59 and the damper plate 66, there is a disadvantage that a local stress by the filler 91 acts on the damper plate 66, a crack is generated as indicated by a reference sign B in FIG. 10, and the damper plate 66 is damaged. As illustrated in FIG. 10, this defect is more significantly generated in a case where the width of the first partition wall 69 is narrower than the width of the second partition wall 59. Hereinafter, a configuration for preventing the generation of this disadvantage will be described.

Figure 11:
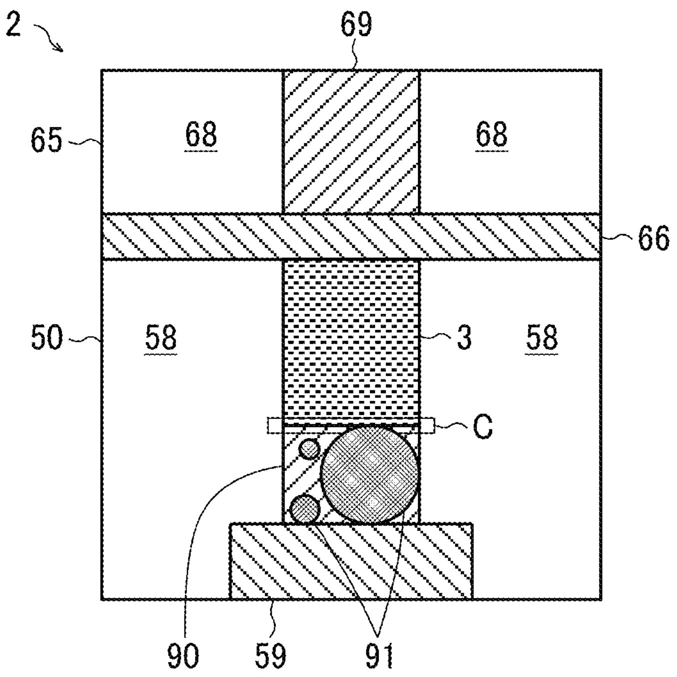
FIG. 11 is an enlarged view illustrating a characteristic portion of a liquid discharge head according to a first embodiment of the present embodiment.

FIG. 11 is an enlarged view of a joint between a second partition wall 59 of a common-channel member 50, a damper plate 66, and the first partition wall 69 of a damper frame substrate 65 in a liquid discharge head 2 according to a first embodiment of the present embodiment. The liquid discharge head 2 is different from the liquid discharge head 1 described above only in that the liquid discharge head 2 includes legs 3 that are integrally provided for the damper plates 66, and are between the damper plates 66 and the second partition walls 59 of the common-channel member 50 forming the piezoelectric-element-holding substrate 70, and other configurations are the same.

The damper frame substrate 65, the damper plates 66, and the legs 3 are manufactured using a semiconductor process. In the present embodiment, films of a material to be the damper plates 66 are formed on a wafer to be a base material. The surface on which the films have been formed, and the damper frame substrate 65 on which spaces in which the damper plates 66 can vibrate are patterned are joined. Thereafter, the wafer used as the base material at the time of the film formation is patterned by photolithography and etching to form the legs 3.

In the present embodiment, Si having a Young's modulus of 190 GPa is used as the legs 3, and the height of the legs 3 is set to 25 μm that is larger than 10 μm, which is the maximum particle diameter of the fillers 91.

In addition, in order not to lower the compliance of the damper member 60, that is, the volume variation rate per reference pressure, the width of the first partition walls 69 and the width of the legs 3 are narrower than the width of the second partition walls 59.

Figure 12:
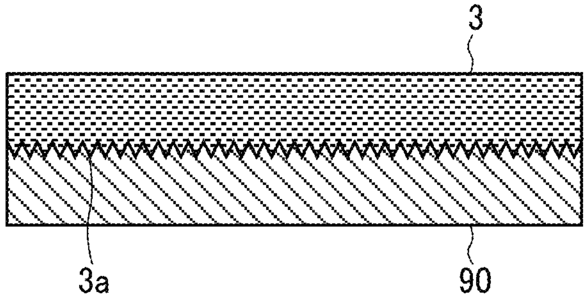
FIG. 12 is an enlarged view of a C portion in FIG. 11.

In order to suppress a decrease in the joining strength of an adhesive 90 due to the smaller joined area due to the narrower width of the legs 3, joined surfaces of the legs 3 joined to the second partition walls 59 have uneven portions 3*a* illustrated in FIG. 12 and formed using a semiconductor process. FIG. 12 is an enlarged view of a reference sign C portion in FIG. 11. The present embodiment illustrates a configuration in which the legs 3 are provided with the uneven portions 3*a*, but it is sufficient if uneven portions are provided for at least one of the leg 3 side or the second partition wall 59 side.

As described above, the liquid discharge head 2 of the present embodiment includes the legs 3 that are provided integrally with the damper plates 66, are between the damper plates 66 and the common-channel member 50 forming the piezoelectric-element-holding substrate 70, and are joined to the common-channel member 50 with the adhesive 90 including the fillers 91. This configuration increases the strength of part of the damper plate 66, and even in a case where a local stress by the filler 91 acts on the damper plate 66, the stress is absorbed by the leg 3 to suppress the generation of a local stress concentration in the damper plate 66 to suppress the damage to the damper plate 66.

The common-channel member 50 and the piezoelectric-element-holding substrate 70 are also referred to as a "second member".

In addition, since the leg 3 is arranged between the second partition wall 59 of the piezoelectric-element-holding substrate 70 and the first partition wall 69 of the damper frame substrate 65, a stress by the filler 91 is surely absorbed by the leg 3, and the generation of a local stress concentration in the damper plate 66 is surely suppressed.

In addition, since the width of the first partition walls 69 is narrower than the width of the second partition walls 59, the width of the legs 3 is within the width of the second partition walls 59 of the piezoelectric-element-holding substrate 70, and the compliance of the damper member 60, that is, the volume variation rate per reference pressure is prevented from falling.

In addition, the height of the legs 3 is higher than the maximum diameter of the fillers 91 included in the adhesive 90. Therefore, when the adhesive 90 that has protruded at a time of the joining is in contact with the damper plate 66, a local stress by the filler 91 is prevented from acting on the damper plate 66.

Since the legs 3 are made of silicon having a Young's modulus of 100 GPa or more, a joint structure between the damper member 60 and the piezoelectric-element-holding substrate 70 is maintained while a sufficient gap between the damper member 60 and the piezoelectric-element-holding substrate 70 is secured. Therefore, even in a case where the adhesive 90 protrudes, the generation of a stress concentration in the damper plate 66 by the filler 91 is suppressed.

In addition, the uneven portion 3*a* is provided on at least one of the joined surfaces of the leg 3 and the second partition wall 59 of the piezoelectric-element-holding substrate 70. Therefore, the adhered area is increased, and an anchor effect is generated in which the adhesive 90 enters, like tree roots, the fine unevenness of the material surface, and is cured to increase the adhering force. Therefore, the joining strength is increased.

In the above-described configuration, the damper plates 66 are formed in such a manner that the compliance, that is, the volume variation rate per reference pressure is 7E-17 or more, the Young's modulus is 3 to 200 GPa, and the thickness is 2 to 10 μm. This configuration allows the damper plates 66 to surely satisfy a function as a damper, that is, a function of dissipating vibration energy to reduce an impact or an amplitude of vibration.

In addition, since the damper plates 66 have a stacked structure including a plurality of layers, the physical properties of the damper plates 66 formed by film formation are changed as desired.

FIG. 13 is an enlarged view of a joint between the first partition wall 69, a damper plate 66, and the second partition wall 59 of a liquid discharge head 4 according to a second embodiment of the present embodiment. The liquid discharge head 4 is different from the liquid discharge head 2 described above only in that the width of the first partition walls 69 is larger than the width of the second partition walls 59, and the liquid discharge head 4 includes legs 5 instead of the legs 3, and other configurations are the same.

The legs 5 are manufactured using a semiconductor process similarly to the legs 3, and the width of the legs 5 is the same as the width of the first partition walls 69, that is, the width of the legs 5 is larger than the width of the second partition walls 59. No uneven portions are formed on joined surfaces of the legs 5 joined to the second partition walls 59.

According to this configuration, the width of the first partition walls 69 and the width of the legs 5 are larger than the width of the second partition walls 59, so that when the second partition wall 59 is joined to the leg 5, the contact between the damper plate 66 and an adhesive 90 due to a protrusion of the adhesive 90 is suppressed, so that the generation of a stress concentration in the damper plate 66 by a filler 91 is suppressed.

Next, a comparison test for comparing crack generation rates in damper plates 66 of a liquid discharge head 6 illustrated in FIG. 14, configured similarly to the conventional liquid discharge head 1, and having no leg, and each of the liquid discharge heads 2 and 4 described above was performed. The crack of the damper plate 66 was evaluated by observing the state of the damper plate 66 with an infrared (IR) microscope after the joining. The test results are illustrated in FIG. 15.

As illustrated in FIG. 15, in the test results, the crack generation rate of each of the first embodiment and the second embodiment was lower than the crack generation rate of Comparative Example 1. For this, it is conceivable that in the configuration of Comparative Example 1, a filler 91 is in direct contact with the damper plate 66, and a local stress concentration is generated, whereas in the configuration of each of the first embodiment and the second embodiment, the legs 3 or 5 are provided to increase the strength of the joined surfaces, and to suppress the contact between the damper plate 66 and a filler 91, so that no crack was generated in the damper plate 66.

From the above, from the viewpoint of the crack of the damper plate 66, the configurations of the liquid discharge heads 2 and 4 have no difference and are good. However, when the compliance of the damper plates 66 is raised, the configuration of the liquid discharge head 2 is preferable.

Figure 24:
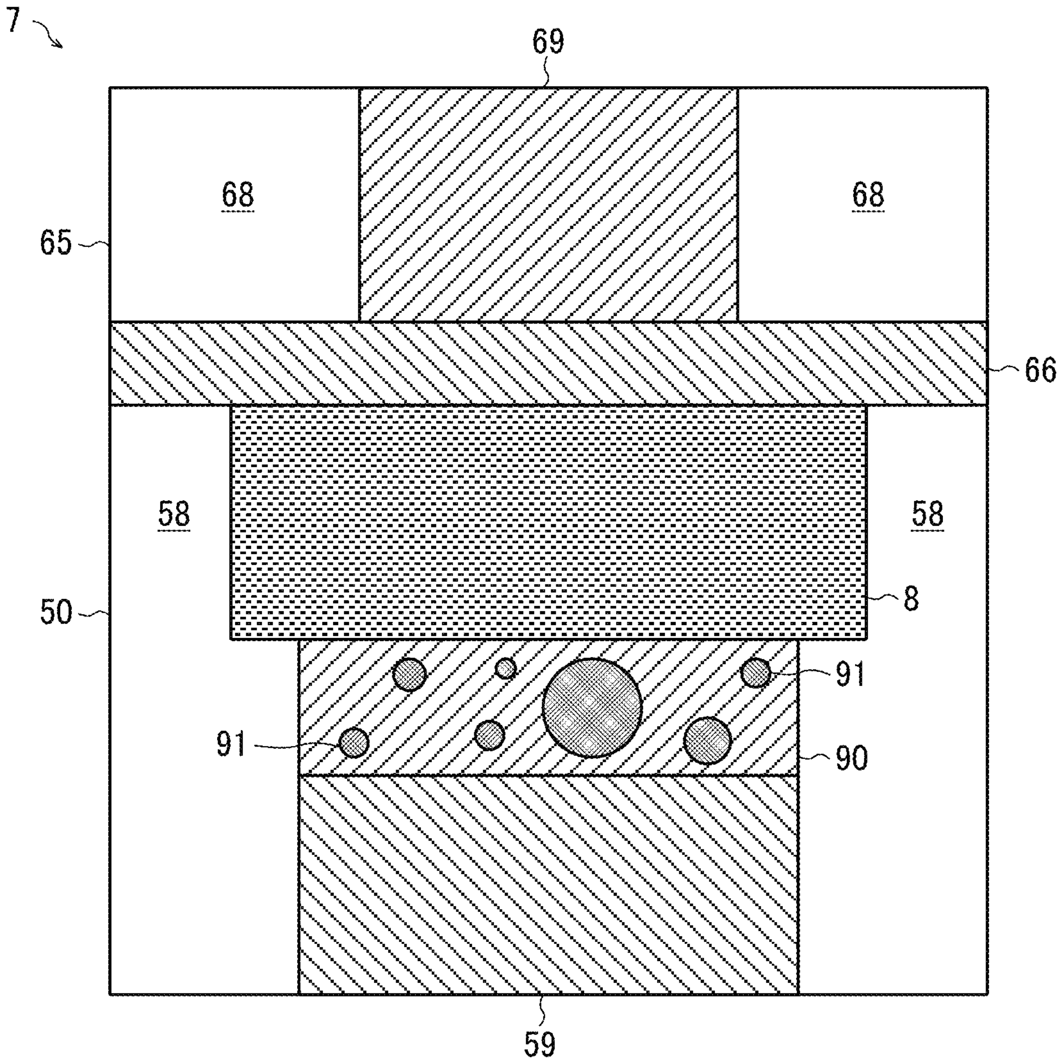
FIG. 24 is an enlarged view illustrating a characteristic portion of a liquid discharge head according to a third embodiment of the present embodiment.

FIG. 24 is an enlarged view of a joint between a first partition wall 69, a damper plate 66, and a second partition wall 59 of a liquid discharge head 7 according to a third embodiment of the present embodiment. The liquid discharge head 7 is different from the liquid discharge head 4 described above only in that the width of the second partition walls 59 is larger than the width of the first partition walls 69, and the liquid discharge head 7 includes, instead of the legs 5, legs 8 having a width larger than the width of the second partition walls 59, and other configurations are the same.

The legs 8 are manufactured using a semiconductor process similarly to the legs 5, and have a width larger than the width of the second partition walls 59. No uneven portions are formed on joined surfaces of the legs 8 joined to the second partition walls 59, According to this configuration, the widths of the second partition walls 59 are larger than the widths of the first partition walls 69, and the width of the legs 8 is larger than the width of the second partition walls 59, so that when the second partition wall 59 is joined to the leg 8, the contact between the damper plate 66 and an adhesive 90 due to a protrusion of the adhesive 90 is suppressed. In addition, the legs 8 and each of the first partition wall 69 and the second partition wall 59 are manufactured using the semiconductor process, and the area of silicon to be etched for the liquid discharge head 7 is reduced as compared with the liquid discharge head 4, so that the generation of pattern defects due to contamination is suppressed.

In addition, since in the above-described configuration, the width of the second partition walls 59 is larger than the width of the first partition walls 69, the joined area between the second partition wall 59 and the leg 8 is increased, and the joining strength is improved. Furthermore, since the distance between the first partition wall 69 and a vibration region of the damper plate 66 is long as compared with the liquid discharge head 4, the variation of the vibration of the damper plate 66 due to a protrusion of the adhesive 90 is suppressed.

Figure 25:
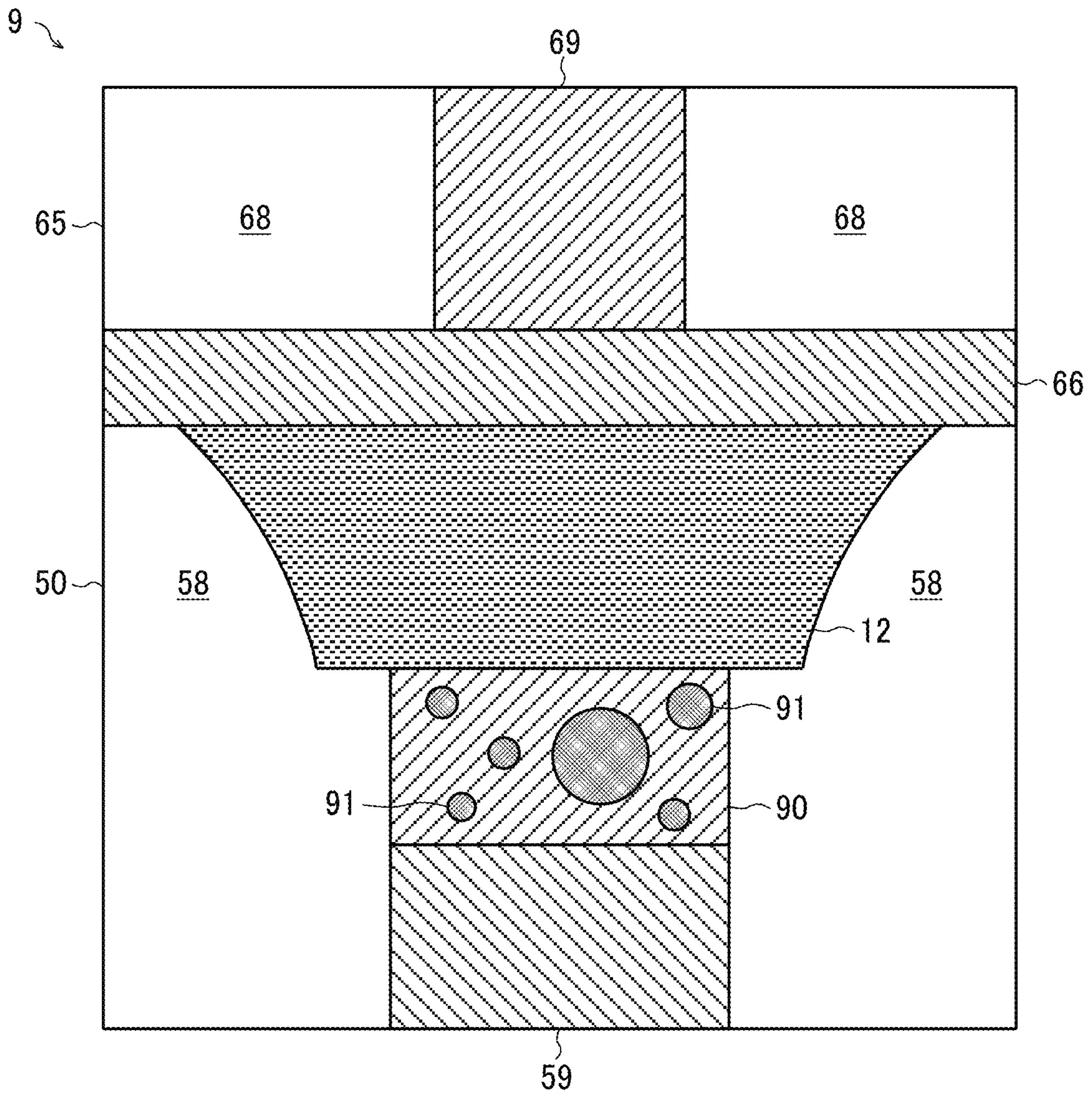
FIG. 25 is an enlarged view illustrating a characteristic portion of a liquid discharge head according to a fourth embodiment of the present embodiment.

FIG. 25 is an enlarged view of a joint of a second partition wall 59, a damper plate 66, and a first partition wall 69 of a liquid discharge head 9 according to a fourth embodiment of the present embodiment The liquid discharge head 9 is different from the liquid discharge head 7 described above only in that the liquid discharge head 9 includes, instead of the legs 8, legs 12 having a shape that is thicker toward the joined surface joined to the damper plate 66 from the joined surface joined to the second partition wall 59, and the other configurations are the same. Thus, the width of the leg 8 increases toward the damper 66.

The legs 12 are manufactured using a semiconductor process similarly to the legs 5. The conditions of the semiconductor process are adjusted to form the legs 12 having a shape that is thicker toward the joined surface joined to the damper plate 66 from the joined surface joined to the second partition wall 59.

According to this configuration, a stress concentration in an edge of the joined surface between the leg 12 and the damper plate 66 is alleviated, and the generation of a crack due to the stress concentration at a time of vibration of the damper plate 66 is suppressed.

Next, a liquid discharge device including the above-described liquid discharge head 2, 4, 7, or 9 will be described.

Figure 16:
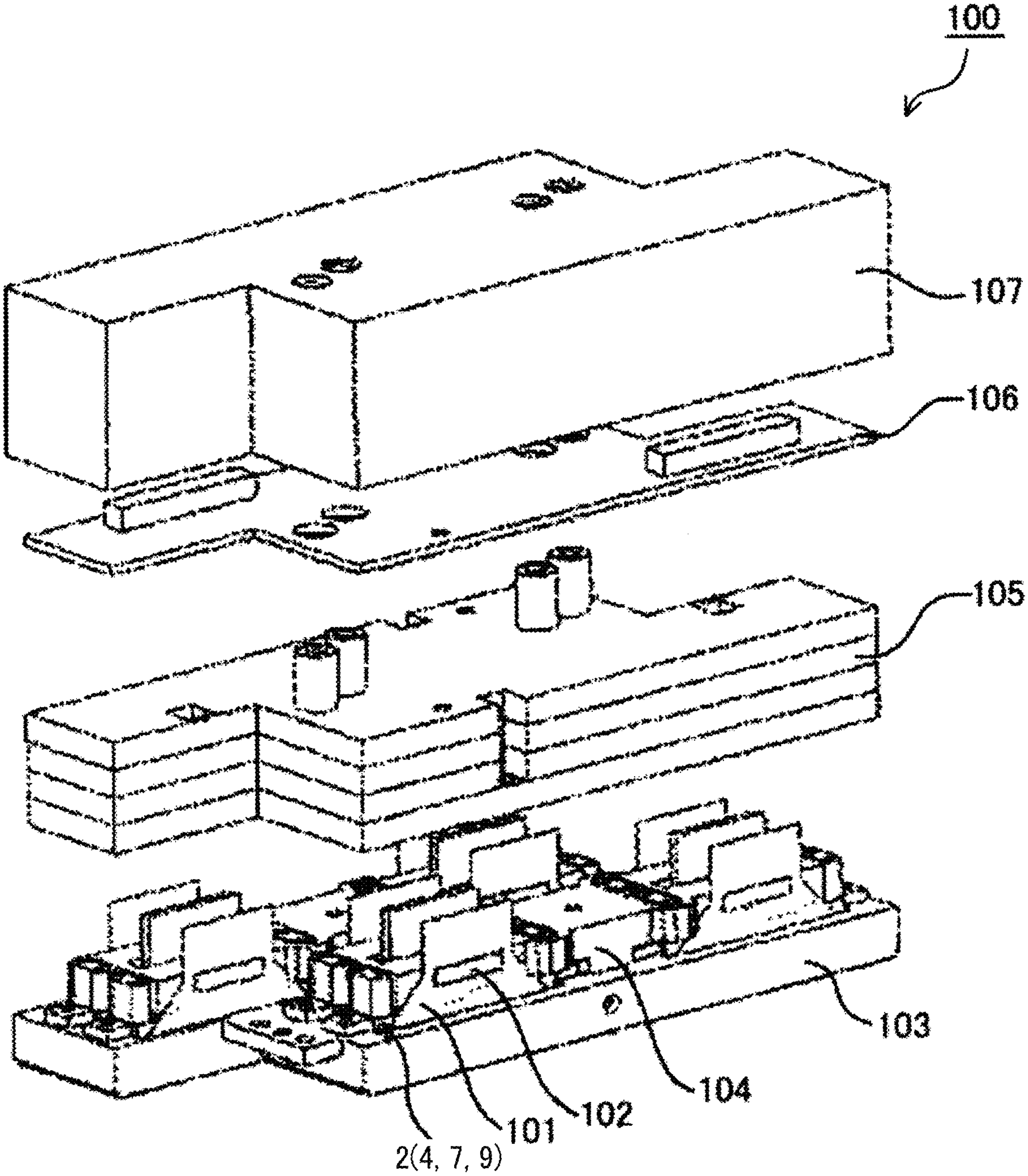
FIG. 16 is a schematic exploded perspective view of a liquid discharge device including the liquid discharge head according to each embodiment of the present embodiment.
Figure 17:
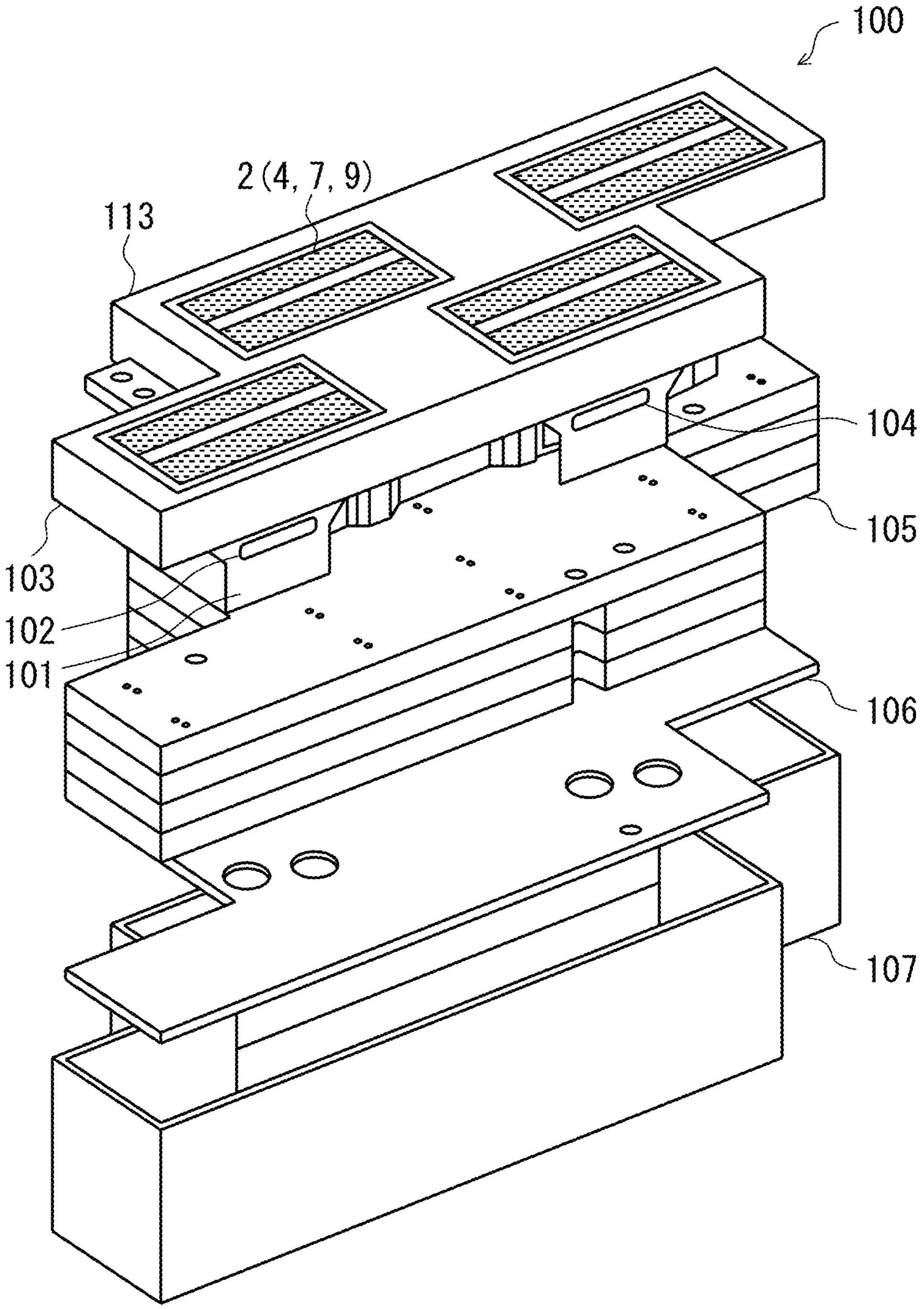
FIG. 17 is a schematic exploded perspective view of the liquid discharge device including the liquid discharge head according to each embodiment of the present embodiment as viewed from a nozzle surface side.

As illustrated in FIGS. 16 and 17, a liquid discharge device 100 includes liquid discharge heads 2, a base member 103 that holds the plurality of liquid discharge heads 2, and a cover member 113 that serves as a nozzle cover of the liquid discharge heads 2. The liquid discharge device 100 further includes a heat dissipation member 104, a manifold 105 forming a channel for supplying liquid to the plurality of liquid discharge heads 2, a printed circuit board (PCB) 106 coupled to flexible wiring boards 101, and a module case 107.

Next, a liquid discharge apparatus including the above-described liquid discharge head 2, 4, 7, or 9 will be described.

Figure 18:
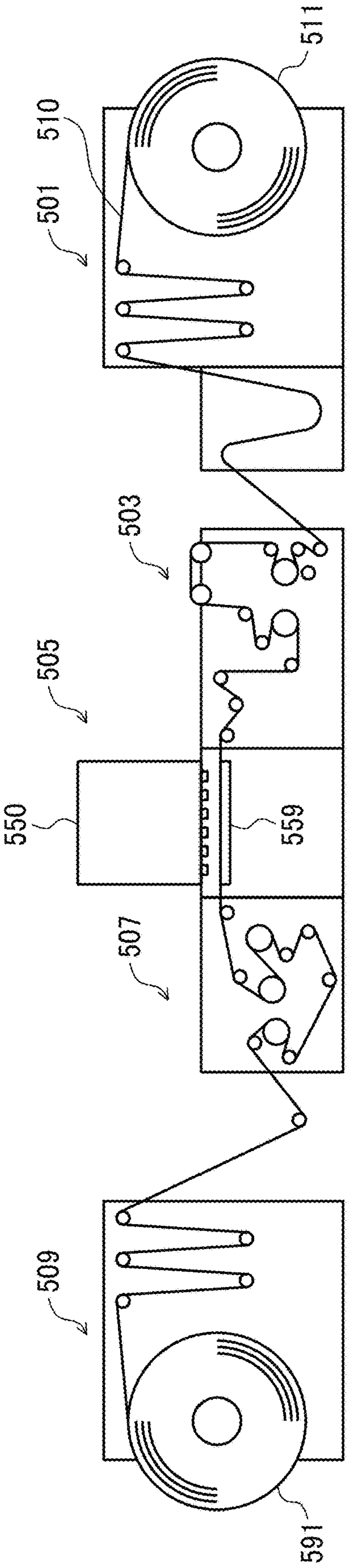
FIG. 18 is a schematic front view of a liquid discharge apparatus including the liquid discharge head according to each embodiment of the present embodiment.
Figure 19:
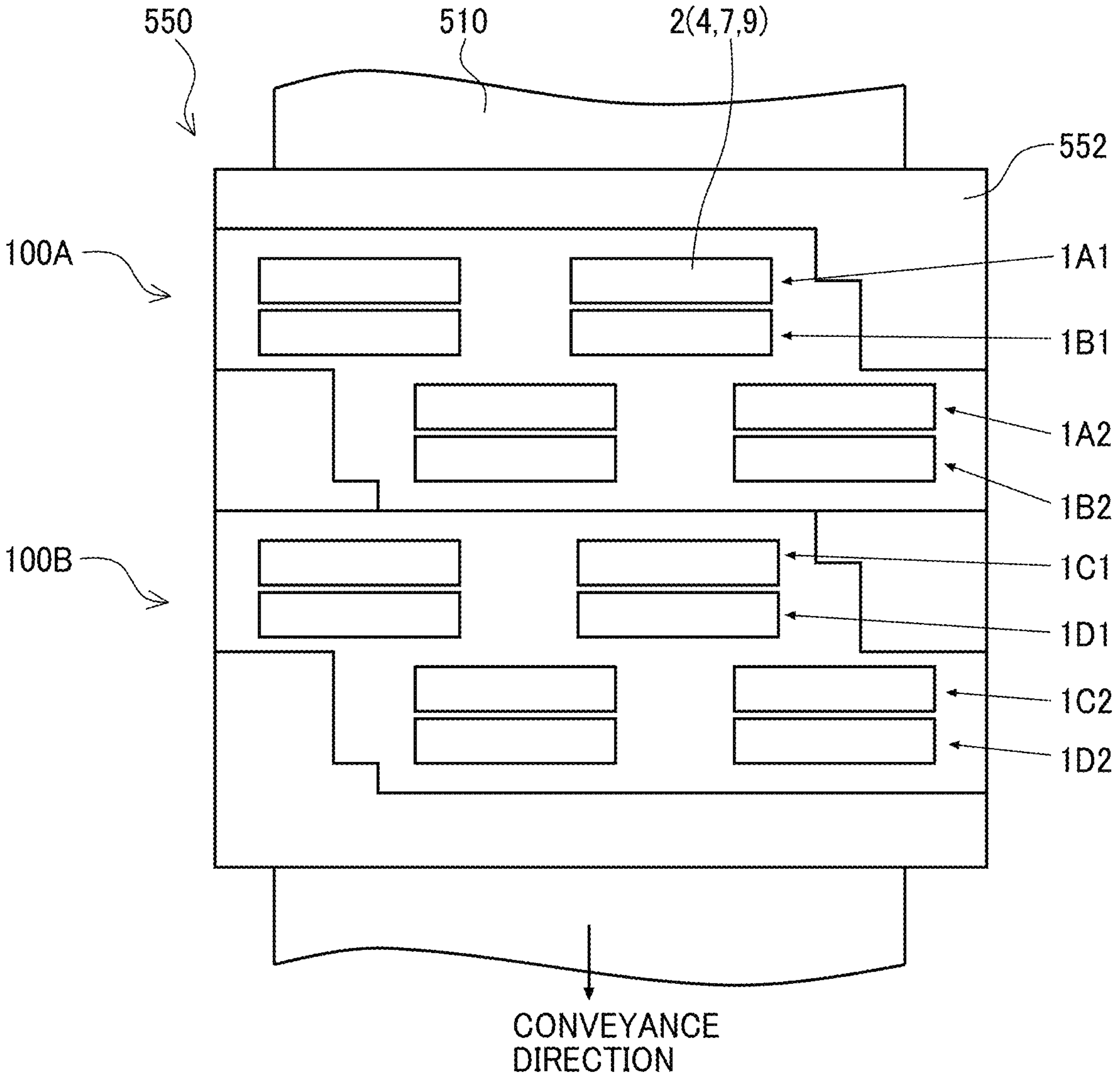
FIG. 19 is a schematic plan view for explaining a liquid discharge device of the liquid discharge apparatus including the liquid discharge head according to each embodiment of the present embodiment.

As illustrated in FIGS. 18 and 19, a printing apparatus 500 serving as a liquid discharge apparatus, includes a conveying-in device 501 that conveys in a continuous thing 510, which is a recording medium, and a guiding and conveying device 503 that guides and conveys the continuous thing 510 conveyed in by the conveying-in device 501, toward a printing device 505. The printing apparatus 500 also includes the printing device 505 that performs a printing operation that discharges liquid droplets onto the continuous thing 510 to form an image, a drying device 507 that dries the continuous thing 510 to which the liquid droplets have stuck, and a conveying-out device 509 that conveys out the continuous thing 510. The guiding and conveying device 503 may also be referred simply as a “conveyor”.

The continuous thing 510 is fed from an original wound roller 511 supported by the conveying-in device 501, guided and conveyed by rollers of the conveying-in device 501, the guiding and conveying device 503, the drying device 507, and the conveying-out device 509, and wound around a winding roller 591 of the conveying-out device 509. In the printing device 505, the continuous thing 510 is conveyed on a conveyance guide member 559 while the continuous thing 510 faces a head unit 550 as a liquid discharge device, and an image is printed with the liquid droplets discharged from the head unit 550.

The printing apparatus 500 includes above-described liquid discharge devices 100A and 100B in the head unit 550. Each of the liquid discharge devices 100A and 100B is provided on a common base member 552.

Assuming that in each of the liquid discharge devices 100A and 100B, a direction in which the liquid discharge heads 2 align, and that is orthogonal to a continuous-thing conveyance direction is a head array direction, a set of head rows 1A1 and 1A2 of the liquid discharge device 100A discharges liquid droplets of the same color. Similarly, a set of head rows 1B1 and 1B2 of the liquid discharge device 100A, a set of head rows 1C1 and 1C2 of the liquid discharge device 100B, and a set of head rows 1D1 and 1D2 of the liquid discharge device 100B discharge liquid droplets of respective desired colors.

Figure 20:
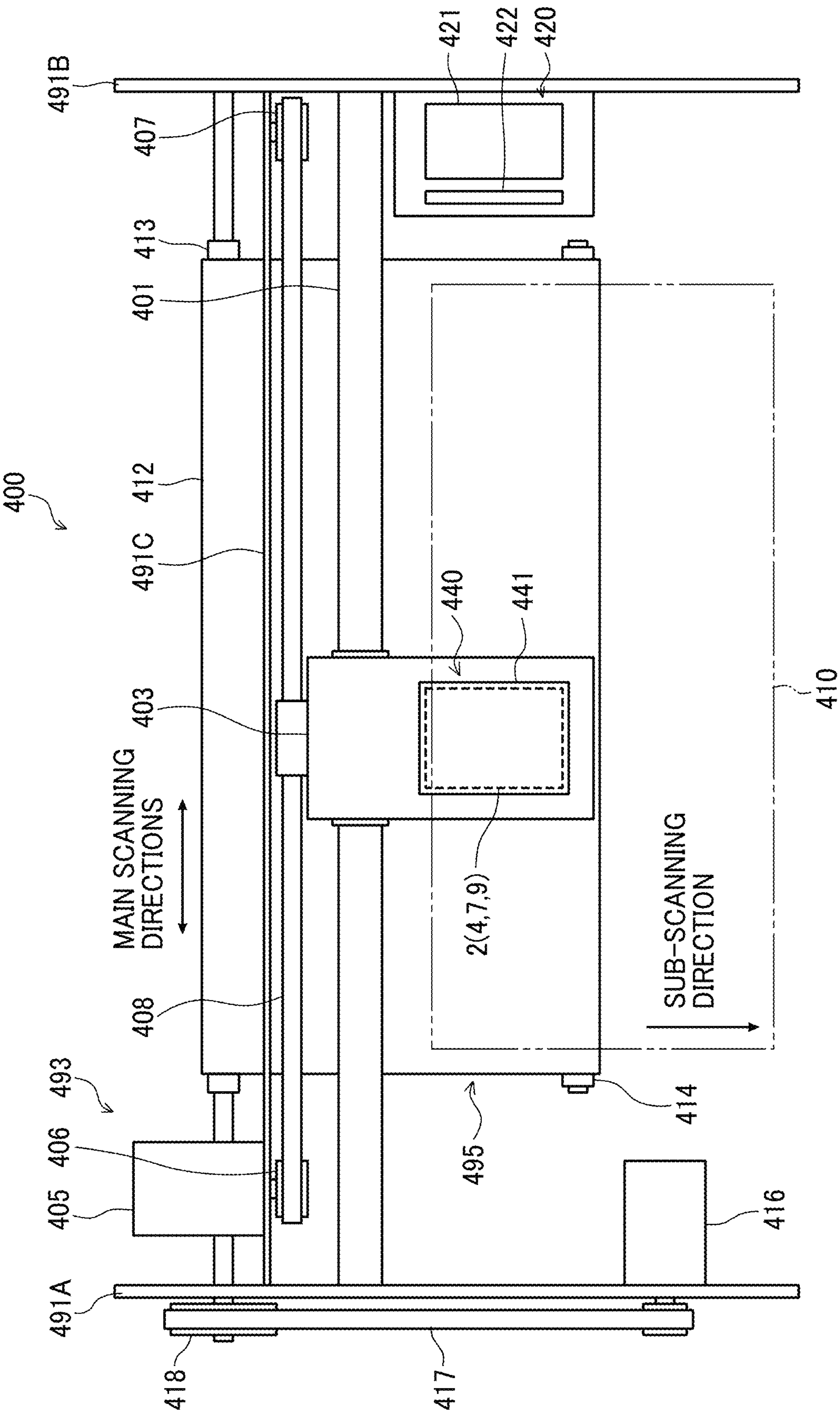
FIG. 20 is a schematic plan view of another liquid discharge apparatus including the liquid discharge head according to each embodiment of the present embodiment.
Figure 21:
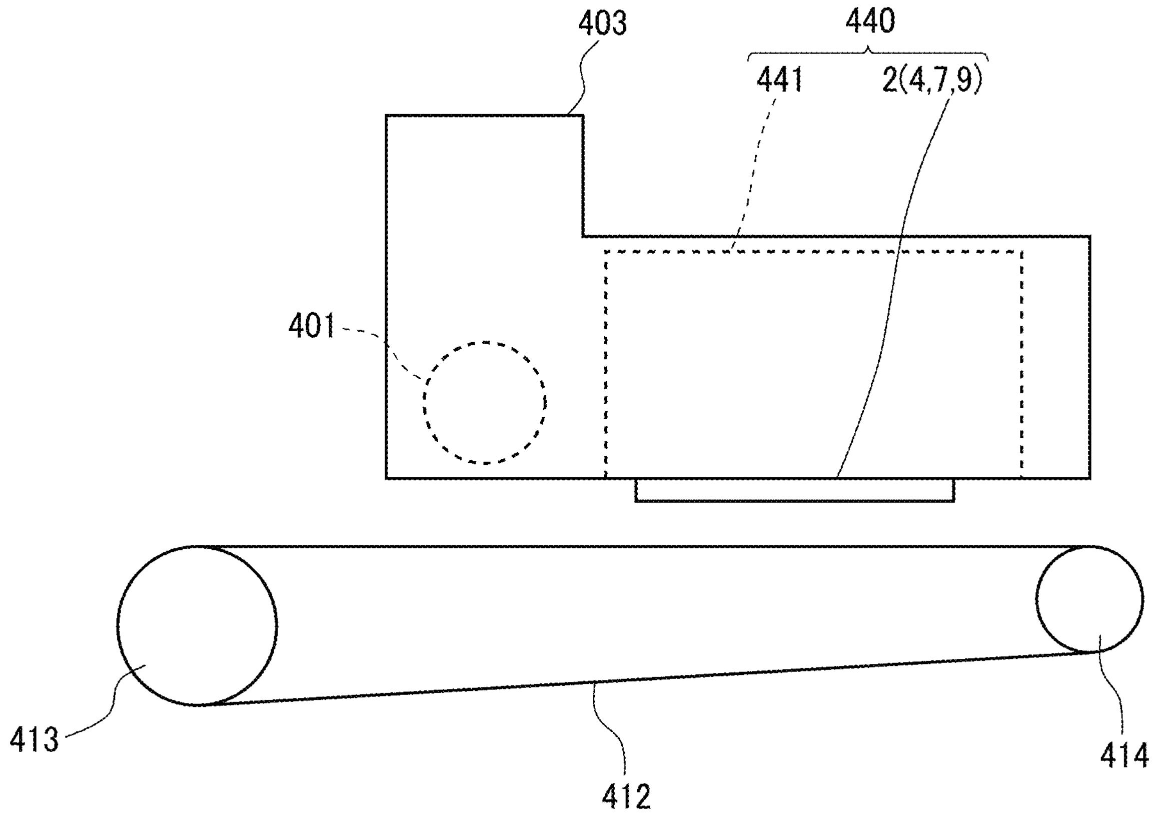
FIG. 21 is a schematic side view of another liquid discharge apparatus including the liquid discharge head according to each embodiment of the present embodiment.

Next, another example of a printing apparatus that is a liquid discharge apparatus according to the present embodiment will be described referring to FIGS. 20 and 21.

A printing apparatus 400 as a liquid discharge apparatus is a serial-type printing apparatus, and a main-scanning movement mechanism 493 makes a carriage 403 reciprocate in main-scanning directions. The main-scanning movement mechanism 493 includes a guide member 401, a main-scanning motor 405, and a timing belt 408. The guide member 401 is stretched between a left side plate 491A and a right side plate 491B, and holds the carriage 403 that is movable. A driving force of the main-scanning motor 405 is transmitted to the carriage 403 via the timing belt 408 stretched between a driving pulley 406 and a driven pulley 407, so that the carriage 403 reciprocate in the main-scanning directions.

The carriage 403 includes a liquid discharge device 440 integrally including a liquid, discharge head 2 and a head tank 441. For example, the liquid discharge head 2 discharges liquid droplets of colors of yellow (Y), cyan (C), magenta (M), and black (K). The liquid discharge head 2 is mounted in a state in which a nozzle row including a plurality of nozzles is arrayed in a sub-scanning direction orthogonal to the main-scanning directions, and the liquid discharge direction is a downward direction. The liquid discharge head 2 is coupled to a liquid circulation device, so that liquids of desired colors are circulated through and supplied to the liquid discharge head 2.

The printing apparatus 400 includes a conveyance mechanism 495 that conveys a plate of paper 410, which is a recording medium. The conveyance mechanism 495 includes a conveyance belt 412, which is a conveyor, and a sub-scanning motor 416 that drives the conveyance belt 412. The conveyance belt 412, which is an endless belt, is stretched between a conveyance roller 413 and a tension roller 414. The conveyance belt 412 attracts a plate of paper 410 and conveys the plate of paper 410 at a position facing the liquid discharge head 2. The attraction is performed by electrostatic attraction, air suction, or the like. A driving force of the sub-scanning motor 416 is transmitted to the conveyance belt 412 via a timing belt 417 and a timing pulley 418, so that the conveyance belt 412 is rotated in the sub-scanning direction.

A maintenance mechanism 420 that maintains the liquid discharge head 2 is arranged on one side of the carriage 403 in the main-scanning direction, and laterally to the conveyance belt 412. The maintenance mechanism 420 includes, for example, a cap member 421 with which a nozzle surface of the liquid discharge head 2 is capped, and a wiper member 422 that wipes the nozzle surface. The main-scanning movement mechanism 493, the maintenance mechanism 420, and the conveyance mechanism 495 are attached to a housing including the left side plate 491A, the right side plate 491B, and a hack plate 491C.

In the printing apparatus 400 having the above-described configuration, a plate of paper 410 is attracted by the conveyance belt 412, and the plate of paper 410 is conveyed in the sub-scanning direction by the rotation of the conveyance belt 412. At this time, the liquid discharge head 2 is driven according to an image signal while the carriage 403 is moved in the main-scanning direction, so that liquid droplets are discharged onto the stopped plate of paper 410 to form an image.

Figure 22:
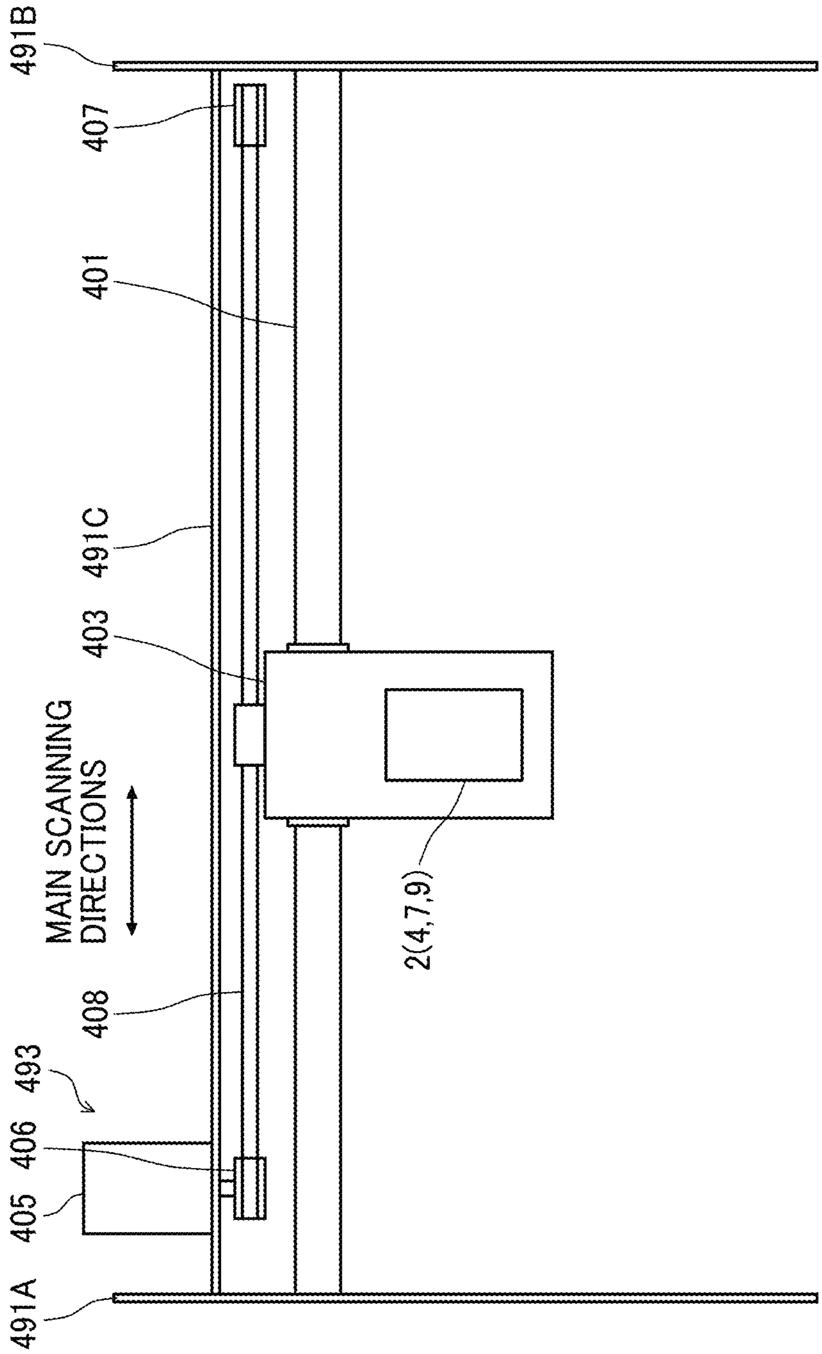
FIG. 22 is a schematic plan view for explaining a liquid discharge device of another liquid discharge apparatus including the liquid discharge head according to each embodiment of the present embodiment.

Next, the liquid discharge device 440 described above will he described referring to FIG. 22.

The liquid discharge device 440 includes a housing portion including each of the left side plate 491A, the right side plate 491B, and the hack plate 491C, the main-scanning movement mechanism 493, the carriage 403, and the liquid discharge head 2, which are among members forming the printing apparatus 400, which is a liquid discharge apparatus.

A liquid discharge device may also be configured by further attaching the above-described maintenance mechanism 420 to, for example, the side plate 491B of this liquid discharge device 440.

Next, another example of a liquid discharge device according to an embodiment of the present embodiment will be described referring to FIG. 23.

Figure 23:
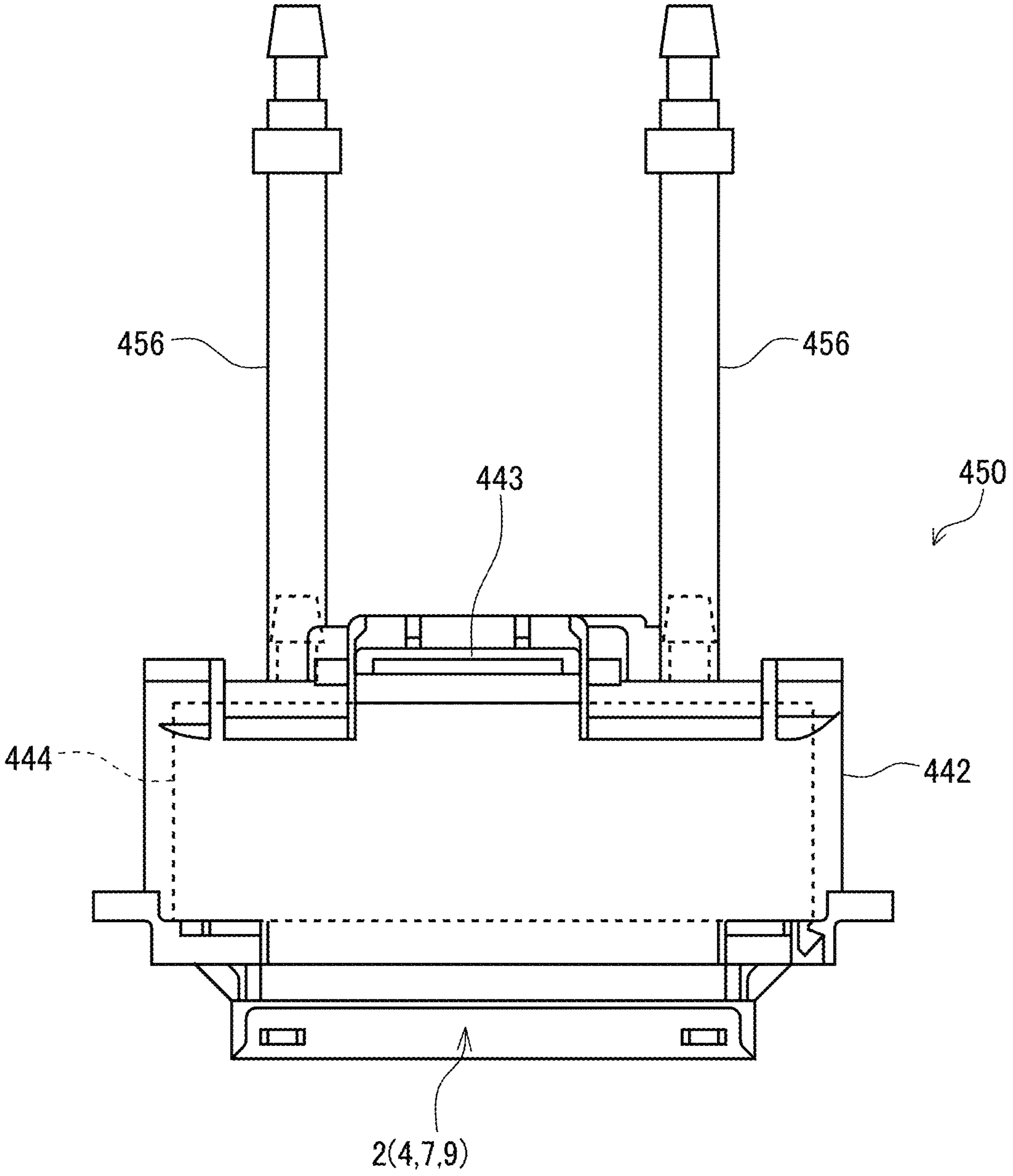
FIG. 23 is a schematic front view for explaining another liquid discharge device of another liquid discharge apparatus including the liquid discharge head according to each embodiment of the present embodiment.

A liquid discharge device 450 illustrated in FIG. 23 includes a liquid discharge head 2 to which a channel component 444 is attached, and tubes 456 coupled to the channel component 444. The channel component 444 is arranged inside a cover 442. The channel component 444 is provided with a connector 443 at an upper portion of the channel component 444. The connector 443 performs electrical coupling to the liquid discharge head 2. Instead of the channel component 444, a head tank 441 may be included.

The liquid discharge devices 100, 100A, 100B, 440, 450, the head unit 550, and the printing apparatuses 400 and 500, which are liquid discharge apparatuses, including the above-described liquid discharge head 2 obtain the same effects as the effects in the above-described liquid discharge head 2. Each of the above configurations illustrates a configuration in which the liquid discharge head 2 is used as a liquid discharge head, but instead of the liquid discharge head 2, each of the liquid discharge heads 4, 7, and 9 may be used. In this case, effects similar to the effects of each of the liquid discharge heads 4, 7, and 9 are obtained.

In the present embodiment, it is sufficient if the used liquid has a viscosity and a surface tension that can be discharged from the head, and the used liquid is not particularly limited. However, it is preferable that the used liquid has a viscosity of 30 mPa·s or less under normal temperatures and normal pressures, or by heating or cooling. More specifically, the used liquid includes solvents, such as water and organic solvents, colorants, such as dyes and pigments, function-imparting materials, such as polymerizable compounds, resins, and surfactants, biocompatible materials, such as deoxyribonucleic acid (DNA), amino acids, proteins, and calcium, edible materials, such as natural pigments, and solutions, suspensions, emulsions, and the like including these. These are used for, for example, applications, such as inkjet ink, surface treatment liquid, and material liquid for three-dimensional modeling.

An energy generation source that discharges liquid droplets may use a piezoelectric actuator (a stacked piezoelectric element and a thin-film piezoelectric element), a thermal actuator using an electrothermal transducer, such as a heat generation resistor, an electrostatic actuator including a diaphragm and counter electrodes, or the like.

The "liquid discharge device" is a liquid discharge head integrated with a functional component or a mechanism, and includes an assembly of components related to discharge of liquid droplets. Examples of the "liquid discharge device" include a combination of the liquid discharge head and at least one of configurations of the head tank, the carriage, the supply mechanism, the maintenance mechanism, the main-scanning movement mechanism, or the liquid circulation device.

Examples of this integration include an integration in which the liquid discharge head and a functional component, or a mechanism are secured to each other by fastening with bolts, adhering, engaging, or the like, and an integration in which one of the liquid discharge head and a functional component or a mechanism is held in such a manner that the one can move relative to the other. Alternatively, the liquid discharge head and a functional component or a mechanism may be detachable from each other.

The liquid discharge device may be a liquid discharge device in which the liquid discharge head and the head tank are integrated, or may be a liquid discharge device in which the liquid discharge head and the head tank are coupled to each other with a tube or the like to be integrated. Between the liquid discharge head and the head tank of these liquid discharge devices, a unit including a filter may be added.

Alternatively, the liquid discharge device may be a liquid discharge device in which the liquid discharge head and the carriage are integrated, or may be a liquid discharge device in which the liquid discharge head, the carriage, and the main-scanning movement mechanism are integrated. Alternatively, the liquid discharge device may be a liquid discharge device in which the liquid discharge head that is movable is held by the guide member forming part of the scanning movement mechanism, so that the liquid discharge head and the scanning movement mechanism are integrated.

The liquid discharge device may be a liquid discharge device in which the cap member that is part of the maintenance mechanism is secured to the carriage to which the liquid discharge head is attached, so that the liquid discharge head, the carriage, and the maintenance mechanism are integrated. Alternatively, the liquid discharge device may be a liquid discharge device in which a tube is coupled to the liquid discharge head to which the head tank or the channel component is attached, so that the liquid discharge head and a supply mechanism are integrated. Through the tube, the liquid of a liquid storage source is supplied to the liquid discharge head.

The main-scanning movement mechanism may include only the guide member. The supply mechanism may include only a tube and a loading unit.

In the present embodiment, the liquid discharge device is described as a combination of the liquid discharge device and the liquid discharge head. However, the liquid discharge device may be a head module or a head unit including the above-described liquid discharge head, and integrated with such a functional component or a mechanism as described above.

The liquid discharge apparatus may be an apparatus that includes the liquid discharge head, the liquid discharge device, a head module, a head unit, or the like, and drives the liquid discharge head to discharge liquid droplets. The liquid discharge apparatus is not only an apparatus that discharges liquid droplets to a thing to which the liquid droplets can stick, but also may be an apparatus that discharges liquid droplets into gas or liquid.

The liquid discharge apparatus may be included in a device related to feeding, conveyance, and paper ejection of a thing to which liquid droplets can stick, or may be included in other pre-treatment apparatuses, post-treatment apparatuses, and the like.

Examples of the liquid discharge apparatus include an image forming apparatus that discharges ink to form an image on a recording medium, and a solid-modeling apparatus (three-dimensional-modeling apparatus) that discharges a modeling liquid to powder layers in which powder has been formed in layers to model a solid model (three-dimensional model).

The liquid discharge apparatus is not limited to an apparatus that discharges liquid droplets to make visible a meaningful image, such as characters or a figure. Examples of the liquid discharge apparatus include an apparatus that forms a pattern or the like that has no meaning by itself, and an apparatus that models a three-dimensional image.

The above-described thing to which the liquid droplets can stick means a thing to which the liquid droplets can at least temporarily stick, and stick and adhere, a thing to which the liquid droplets can at least temporarily stick, and stick and permeate, and the like. Specific examples of the above-described thing to which the liquid droplets can stick include recording media, such as plates of paper, films, and cloth, electronic components, such as electronic substrates and piezoelectric elements, and media, such as granular-material layers (powder layers), organ models, and inspection cells, and include all things to which the liquid droplets stick unless otherwise specified.

Things to which the liquid droplets can stick have any material property as long as the liquid droplets can even temporarily stick to the things, such as paper, thread, fiber, fabric, leather, metal, plastic, glass, wood, and ceramics.

The liquid discharge apparatus includes a configuration in which the liquid discharge head and a thing to which the liquid droplets can stick move relative to each other, but the target to be moved is not limited to either of the liquid discharge head and the thing. The specific examples include both a serial-type apparatus that moves the liquid discharge head, and a line-type apparatus that does not move the liquid discharge head.

As the liquid discharge apparatus, also exemplified are a treatment-liquid-coating apparatus that discharges a treatment liquid onto a surface of a plate of paper to coat the surface of the plate of paper with the treatment liquid for the purpose of modifying the surface of the plate of paper, and an injection particle-making apparatus that injects, through a nozzle, a composition liquid in which a raw material is dispersed in a solution to make fine particles of the raw material.

Aspects of the present embodiment are, for example, as follows:

Aspect 1

A liquid discharge head includes: a damper that reduces vibration energy; a damper-holding substrate to which the damper is joined, and that has a space in which the damper can vibrate; a piezoelectric-element-holding substrate that is provided on the damper on a side opposite the damper-holding substrate, and has a recess that contains a piezoelectric element, and a space in which the damper can vibrate; and a leg that is integrally provided with the damper, is between the damper and the piezoelectric-element-holding substrate, and is joined to the piezoelectric-element-holding substrate with an adhesive that includes a filler.

Aspect 2

In the liquid discharge head according to aspect 1, the piezoelectric-element-holding substrate may include a first partition wall that forms the space, the damper-holding substrate may include a second partition wall that forms the space, and the leg may be arranged between the first partition wall and the second partition wall.

Aspect 3

In the liquid discharge head according to aspect 2, a width of the second partition wall and a width of the leg may be narrower than a width of the first partition wall.

Aspect 4

In the liquid discharge head according to aspect 2, a width of the leg may be wider than a width of the first partition wall and a width of the second partition wall.

Aspect 5

In the liquid discharge head according to aspect 4, the width of the second partition wall may be narrower than the width of the first partition wall.

Aspect 6

In the liquid discharge head according to any one of aspects 1 to 5, the leg may have a shape that is thicker toward the damper from the piezoelectric-element-holding substrate.

Aspect 7

In the liquid discharge head according to any one of aspects 1 to 6, a height of the leg may be larger than a maximum diameter of the filler.

Aspect 8

In the liquid discharge head according to any one of aspects 1 to 7, the leg may include silicon that has a Young's modulus of 100 GPa or more.

Aspect 9

In the liquid discharge head according to any one of aspects 1 to 8, at least one of joined surfaces of the piezoelectric-element-holding substrate and the leg may have an uneven portion.

Aspect 10

In the liquid discharge head according to any one of aspects 1 to 9, the damper may have a compliance of 7E-17 or more, a Young's modulus of 3 to 200 GPa, and a thickness of 2 to 10 μm.

Aspect 11

In the liquid discharge head according to any one aspects 1 to 10, the damper may have a stacked structure that includes a plurality of layers.

Aspect 12

A liquid discharge device includes the liquid discharge head according to any one of aspects 1 to 11.

Aspect 13

A liquid discharge apparatus includes the liquid discharge head according to any one of aspects 1 to 11.

Aspect 14

A liquid discharge apparatus includes the liquid discharge device according to aspect 12.

Aspect 15

A liquid discharge head (1) includes: a piezoelectric element (40) configured to vibrate; a damper (66) configured to reduce vibration energy generated by the piezoelectric element (40); a first substrate (65) joined to the damper (66), the first substrate (65) having a first space (68) facing one surface of the damper (66) vibrates; a second substrate (50) opposite to the first substrate (65) via the damper (66), the second substrate (50) having: a recess (75) accommodating the piezoelectric element, and a second space (58) facing another surface of the damper, the second space disposed opposite to the first space via the damper (66); and a leg (3) between the damper (66) and the second substrate (50), the leg (3) joined to the second substrate (50) with an adhesive (90) including a filler (91).

Aspect 16

In the liquid discharge head (1) according to aspect 15, the first substrate (65) includes a first partition wall (69) forming the first space (68), the second substrate (50) includes a second partition wall (59) forming the second space (58), and the leg (3) is between the damper (66) and the second partition wall (59).

Aspect 17

In the liquid discharge head (1) according to aspect 16, each of a width of the first partition wall (69) and a width of the leg(3) is narrower than a width of the second partition wall (59).

Aspect 18

In the liquid discharge head (1) according to aspect 16, a width of the leg (3) is wider than each of a width of the first partition wall (69) and a width of the second partition wall (59).

Aspect 19

In the liquid discharge head (1) according to aspect 4, the width of the first partition wall (69) is narrower than the width of the second partition wall (59).

Aspect 20

In the liquid discharge head (1) according to aspect 19, the width of the leg (3) increases toward the damper.

Aspect 21

In the liquid discharge head (1) according to aspect 15, a eight of the leg (3) is larger than a maximum diameter of the filler.

Aspect 22

In the liquid discharge head (1) according to aspect 15, the leg (3) includes silicon having a Young's modulus of 100 GPa or more.

Aspect 23

In the liquid discharge head (1) according to aspect 15, wherein at least one of joined surfaces between the second substrate (50) and the leg (3) has an uneven portion.

Aspect 24

In the liquid discharge head (1) according to aspect 15, the damper has a compliance of 7E-17 or more, a Young's modulus of 3 to 200 GPa, and a thickness of 2 to 10 μm.

Aspect 25

In the liquid discharge head (1) according to aspect 15, the damper (66) has a laminated structure including multiple layers.

Aspect 26

A liquid discharge device (100) includes multiple liquid discharge heads including the liquid discharge head according to aspect 15.

Aspect 27

A liquid discharge apparatus (500) includes the liquid discharge head (1) according to aspect 15, and a conveyor (503) configured to convey a medium to a position facing the liquid discharge head.

Aspect 28

A liquid discharge apparatus (500) includes the liquid discharge device (100) according to aspect 16, and a conveyor (503) configured to convey a medium to a position facing the liquid discharge device (100).

The present embodiment provides the liquid discharge head in which the leg is provided to increase the strength of part of the damper, and even in a case where a local stress by the filler acts on the damper, the stress is absorbed by the leg to suppress the generation of a local stress concentration in the damper to suppress the damage to the damper.

Although the preferred embodiments of the present embodiment have been described above, the present embodiment is not limited to the specific embodiments, and various modifications and changes can be made within the scope of the gist of the present embodiment described in the claims unless otherwise limited in the above description.

The effects described in the embodiments of the present embodiment are merely examples of the most preferable effects generated from the present embodiment, and the effects of the present embodiment are not limited to those described in the embodiments of the present embodiment.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:
- a piezoelectric element to vibrate;
- a damper to reduce vibration energy generated by the piezoelectric element;
- a first substrate joined to the damper, the first substrate having a first space facing one surface of the damper;
- a second substrate opposite to the first substrate via the damper, the second substrate having:
  - a recess accommodating the piezoelectric element, and
  - a second space facing another surface of the damper, the second space disposed opposite to the first space via the damper; and
- a leg between the damper and the second substrate, the leg joined to the second substrate with an adhesive including a filler.

2. The liquid discharge head according to claim 1, wherein;
- the first substrate includes a first partition wall forming the first space,
- the second substrate includes a second partition wall forming the second space, and
- the leg is between the damper and the second partition wall.

3. The liquid discharge head according to claim 2, wherein:
- each of a width of the first partition wall and a width of the leg is narrower than a width of the second partition wall.

4. The liquid discharge head according to claim 2, wherein;
- a width of the leg is wider than each of a width of the first partition wall and a width of the second partition wall.

5. The liquid discharge head according to claim 4, wherein;
- the width of the first partition wall is narrower than the width of the second partition wall.

6. The liquid discharge head according to claim 5, wherein;
- the width of the leg increases toward the damper.

7. The liquid discharge head according to claim 1, wherein;
- a height of the leg is larger than a maximum diameter of the filler.

8. The liquid discharge head according to claim 1, wherein;
- the leg comprises silicon having a Young's modulus of 100 GPa or more.

9. The liquid discharge head according to claim 1, wherein;
- at least one of joined surfaces between the second substrate and the leg has an uneven portion.

10. The liquid discharge head according to claim 1, wherein;

the damper has a compliance of 7E-17 or more, a Young's modulus of 3 to 200 GPa, and a thickness of 2 to 10 μm.

11. The liquid discharge head according to claim 1, wherein;

the damper has a laminated structure including multiple layers.

12. A liquid discharge device comprising:

multiple liquid discharge heads including the liquid discharge head according to claim 1.

13. A liquid discharge apparatus comprising:

the liquid discharge device according to claim 12, and a conveyor to convey a medium to a position facing the liquid discharge device.

14. A liquid discharge apparatus comprising:

the liquid discharge head according to claim 1, and a conveyor to convey a medium to a position facing the liquid discharge head.

15. A liquid discharge head comprising:

a piezoelectric element to vibrate;

means for reducing vibration energy generated by the piezoelectric element;

a first substrate joined to the means for reducing vibration energy, the first substrate having a first space facing one surface of the means for reducing vibration energy;

a second substrate opposite to the first substrate via the means for reducing vibration energy, the second substrate having:

a recess accommodating the piezoelectric element, and a second space facing another surface of the means for reducing vibration energy, the second space disposed opposite to the first space via the means for reducing vibration energy; and a leg between the means for reducing vibration energy and the second substrate, the leg joined to the second substrate with an adhesive including a filler.

16. The liquid discharge head according to claim 15, wherein:

the first substrate includes a first partition wall forming the first space, the second substrate includes a second partition wall forming the second space, and the leg is between the means for reducing vibration energy and the second partition wall.

17. The liquid discharge head according to claim 16, wherein:

each of a width of the first partition wall and a width of the leg is narrower than a width of the second partition wall.

18. The liquid discharge head according to claim 16, wherein:

a width of the leg is wider than each of a width of the first partition wall and a width of the second partition wall.

19. The liquid discharge head according to claim 18, wherein:

the width of the first partition wall is narrower than the width of the second partition wall.

20. The liquid discharge head according to claim 19, wherein:

the width of the leg increases toward the means for reducing vibration energy.

* * * * *